(12) United States Patent
Chino et al.

(10) Patent No.: US 7,604,083 B2
(45) Date of Patent: Oct. 20, 2009

(54) STEERING APPARATUS FOR A VEHICLE

(75) Inventors: Naotaka Chino, Kanagawa (JP);
Takaaki Eguchi, Kanagawa (JP);
Tetsuya Osonoi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 606 days.

(21) Appl. No.: 11/447,742

(22) Filed: Jun. 6, 2006

(65) Prior Publication Data
US 2006/0272882 A1 Dec. 7, 2006

(30) Foreign Application Priority Data
Jun. 7, 2005 (JP) ............................. 2005-167200
Jun. 30, 2005 (JP) ............................. 2005-192325
Jul. 15, 2005 (JP) ............................. 2005-206271

(51) Int. Cl.
*B62D 5/00* (2006.01)
(52) U.S. Cl. ........................ 180/402; 180/405
(58) Field of Classification Search ................. 180/402, 180/403, 405, 406, 407
See application file for complete search history.

(56) References Cited

U.S. PATENT DOCUMENTS

| 5,455,770 | A | 10/1995 | Hadeler et al. |
| 6,580,989 | B1* | 6/2003 | Husain et al. .................. 701/41 |
| 6,622,813 | B2* | 9/2003 | Matz et al. ................... 180/411 |
| 6,929,086 | B1* | 8/2005 | Husain et al. ................ 180/413 |
| 6,938,721 | B2* | 9/2005 | Ono et al. .................... 180/402 |
| 7,004,279 | B2* | 2/2006 | Shitamitsu et al. ........... 180/402 |
| 7,007,769 | B2* | 3/2006 | Hara et al. ................... 180/402 |
| 7,322,439 | B2* | 1/2008 | Hara et al. ................... 180/402 |
| 7,469,768 | B2* | 12/2008 | Chino et al. ................. 180/405 |
| 2003/0127274 | A1* | 7/2003 | Dominke et al. ............. 180/402 |
| 2004/0262072 | A1* | 12/2004 | Hara et al. ................... 180/402 |
| 2005/0072621 | A1* | 4/2005 | Hara et al. ................... 180/444 |
| 2005/0082108 | A1* | 4/2005 | Husain ........................ 180/402 |

(Continued)

FOREIGN PATENT DOCUMENTS

DE 19964032 7/2001

(Continued)

OTHER PUBLICATIONS

PCT International Search Report for PCT/IB2007/050502 issued Jul. 17, 2007.

*Primary Examiner*—Lesley D Morris
*Assistant Examiner*—Marc A Scharich
(74) *Attorney, Agent, or Firm*—Young Basile

(57) ABSTRACT

To reduce the length in an axis direction of a steering unit and consequently to provide a vehicle steering apparatus with superior vehicle mountability, a steering apparatus for a vehicle has a steering unit, a reaction generating unit and a steered unit. The steering unit and the steered unit are mechanically separated. The apparatus includes a clutch that mechanically connects the steering unit and the steered unit, and a backup unit is provided between the clutch and the steered unit and transmits steering torque that is inputted from the steering unit, when the clutch is engaged, to the steered unit. A rotation conversion unit that outputs rotation in a rotation axis direction of the clutch that is different from the axis direction of the steering unit is provided between the reaction generating unit and the clutch.

19 Claims, 28 Drawing Sheets

U.S. PATENT DOCUMENTS

2005/0209751 A1    9/2005  Kato
2008/0230300 A1 *  9/2008  Hara et al. ................ 180/402

FOREIGN PATENT DOCUMENTS

| DE | 10338706    | 3/2004 |
| DE | 10328685    | 1/2005 |
| DE | 10348399    | 5/2005 |
| EP | 1088739     | 4/2001 |
| EP | 1577194     | 9/2005 |
| JP | 6247269     | 9/1994 |
| JP | 10-067327   | 3/1998 |
| JP | 2001088722  | 4/2001 |
| JP | 2002-225733 | 8/2002 |
| JP | 2004075013  | 3/2004 |
| JP | 2005262926  | 9/2005 |

* cited by examiner

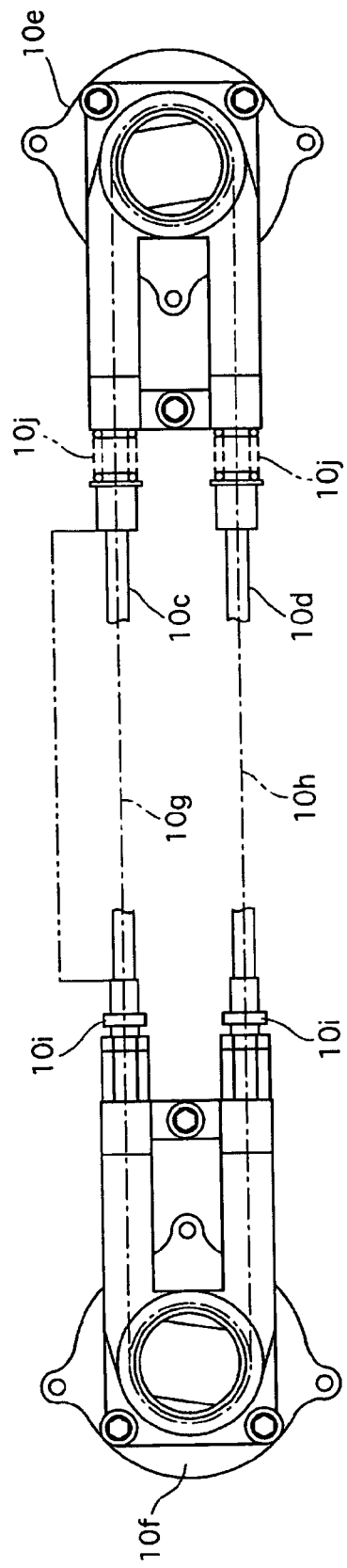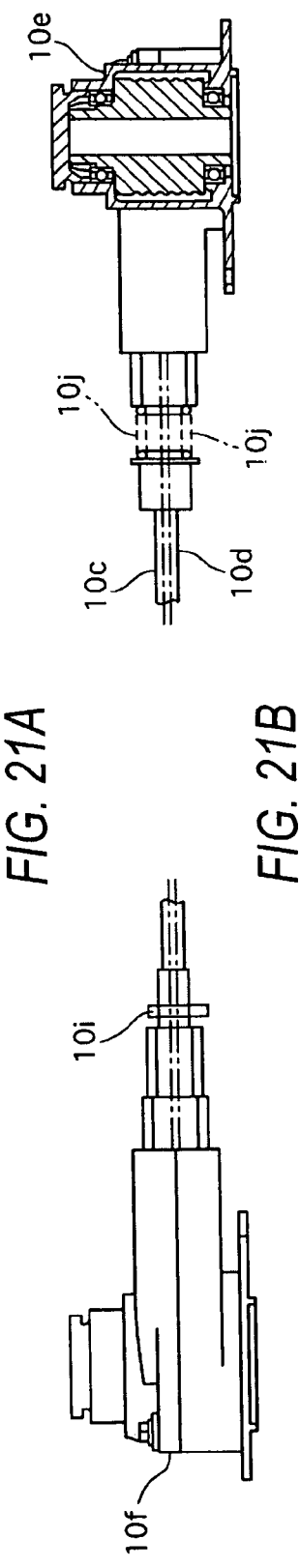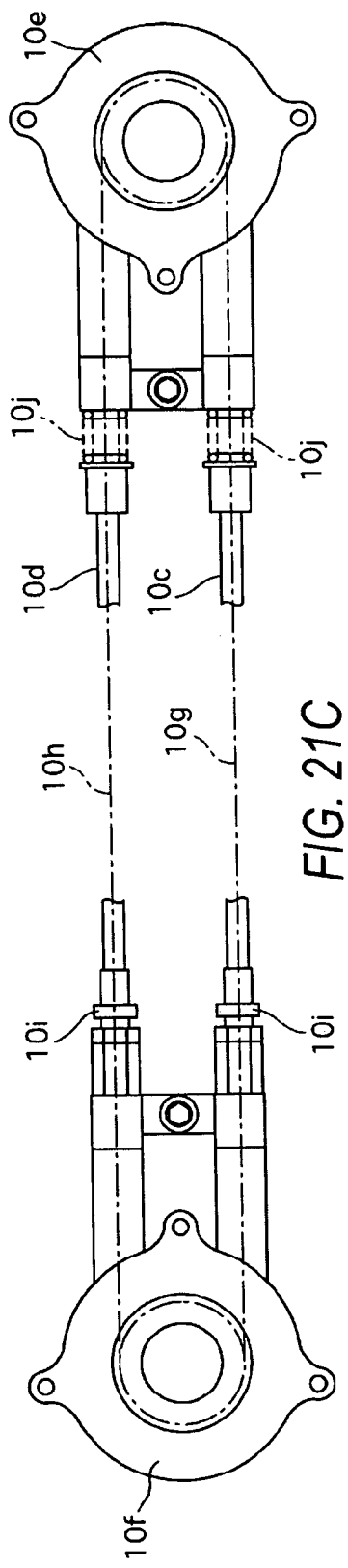
FIG. 21A
FIG. 21B
FIG. 21C

STEERING APPARATUS FOR A VEHICLE

CROSS-REFERENCES TO RELATED APPLICATIONS

This application claims priority from Japanese Patent Application Serial No. 2005-167200 filed Jun. 7, 2005, 2005-192325 filed Jun. 30, 2005, and 2005-206271 filed Jul. 15, 2005, the contents of which are incorporated herein by reference in their entirety.

FIELD

The present vehicle steering apparatus that is employed for a steer-by-wire system will be described below.

BACKGROUND

In a conventional steer-by-wire system, a column shaft connected to a steering wheel is connected to a reaction motor, a clutch and a steering wheel side cable pulley of a backup means, as described in, for example, Japanese Laid Open Patent Application No. 2002-225733.

In the conventional vehicle steering apparatus having a cable-type column, one end of a first cable is connected to the steering wheel, and one end of a second cable is connected to a gear box. The other end of the first cable and the other end of the second cable are connected with an intermediate interlocking means provided between the steering wheel and the gear box. In such a system, it is not necessary to lead the cable through a dash panel that is provided between the steering wheel and the gear box so that it is possible to assemble the first and second cables without any interference. For example, see Japanese Laid Open Published Patent Application No. H10-67327.

SUMMARY

In one embodiment of the present vehicle steering apparatus, a rotation axis direction of the steering unit is changed to a different direction by a rotation direction conversion unit before the rotation transmitted from the steering unit is transmitted to a clutch, so that the length of the steering unit may be shortened.

Thus, the steering apparatus for a vehicle is reduced in size in the axis direction of the steering unit so that superior vehicle mountability may be obtained.

BRIEF DESCRIPTION OF THE DRAWINGS

Other features and advantages of the present steering apparatus for a vehicle will be apparent from the ensuing description, taken in conjunction with the accompanying drawings, in which:

FIGS. 21A, 21B and 21C show a cable-type column;

DETAILED DESCRIPTION OF THE ILLUSTRATED EMBODIMENTS

While the claims are not limited to the illustrated embodiments, an appreciation of various aspects of the steering apparatus for a vehicle is best gained through a discussion of various examples thereof.

Embodiments 1 to 17 will be described by referring to drawings.

Embodiment 1

Figure 1:
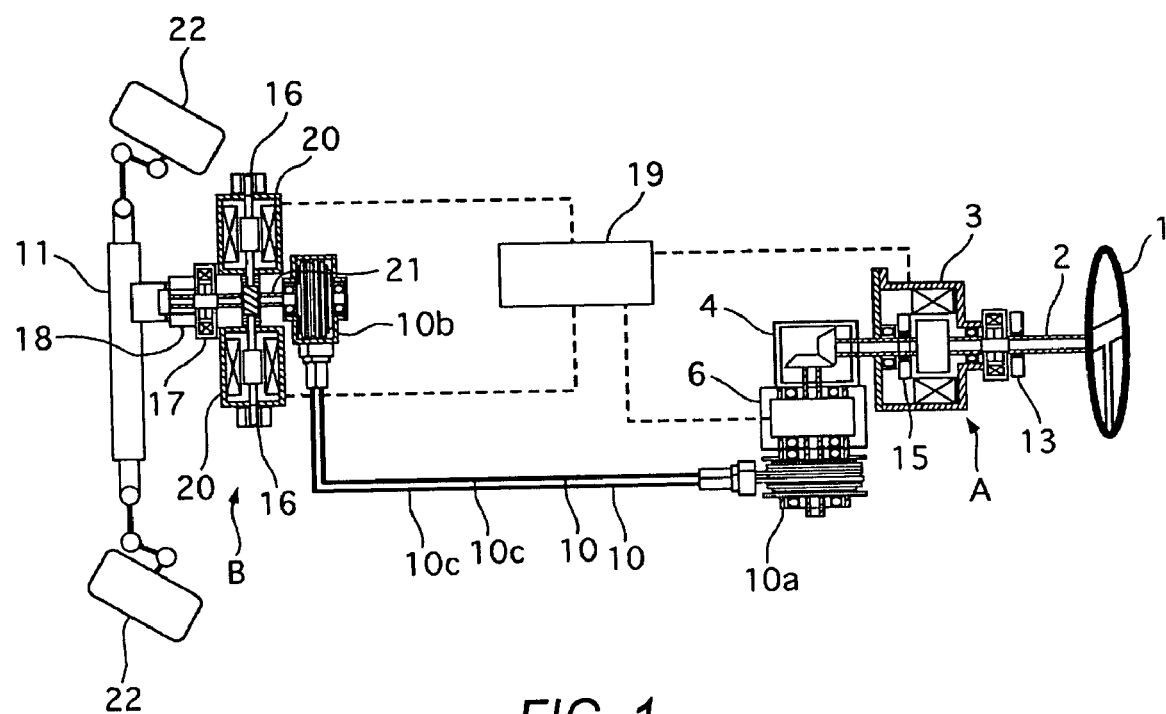
FIG. 1 shows a steer-by-wire system to which a vehicle steering apparatus according to Embodiment 1 is applied.

FIG. 1 is a schematic view of an overview of the structure of a steer-by-wire system to which a vehicle steering apparatus according to Embodiment 1 is applied. The vehicle steering apparatus comprises a steering unit A, a cable-type column 10, a steered unit B and a controller 19, each of which will be described below.

Figure 2:
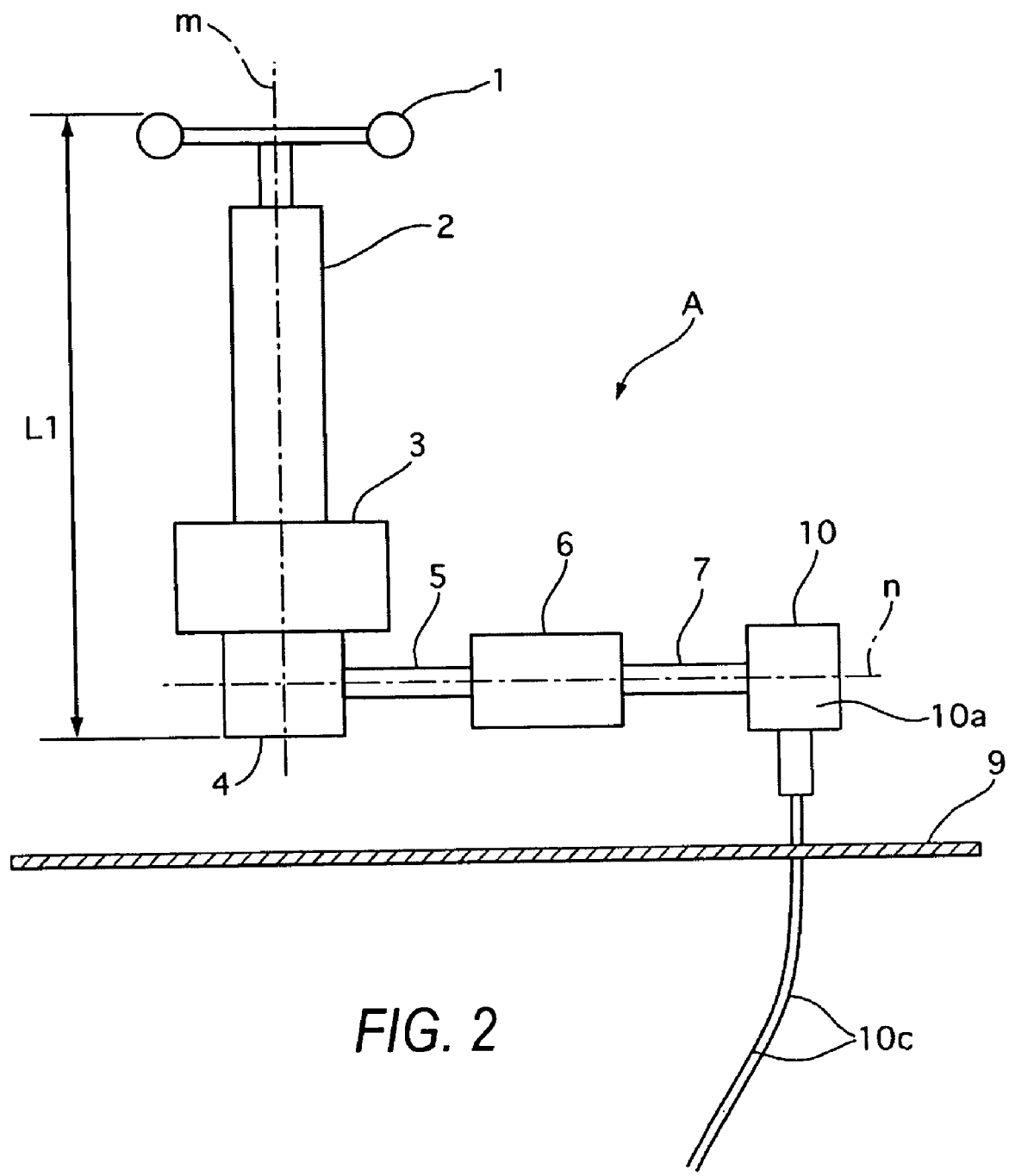
FIG. 2 shows the detailed structure of a steering unit according to Embodiment 1.

As shown in FIGS. 1 and 2, the steering unit A comprises a steering wheel operation input unit 1, a column shaft 2, a reaction motor (reaction actuator) 3, a bevel gear (a rotation direction conversion unit) 4, a clutch 6, a steering wheel angle sensor 13, and a resolver 15.

The reaction motor 3 is a coaxial motor, whose output axis is coaxial with the column shaft 2, and outputs a steering reaction torque to the column shaft 2, which simulates a road surface reaction according to a command current value from the controller 19. The bevel gear 4 is provided between the reaction motor 3 and the clutch 6, and the bevel gear 4 changes the rotation axis direction of the steering wheel 1 (axis direction of the column shaft 2) so as to be different from the rotation axis direction of the clutch 6.

The clutch 6 is provided between the column shaft 2 and the cable-type column 10. In Embodiment 1, an electromagnetic clutch is used. When the clutch 6 is engaged, the steering torque applied to the steering wheel 1 is mechanically transmitted to the a steering mechanism 11. In addition, the steering wheel angle sensor 13 detects the rotation angle of the column shaft 2. The resolver 15 detects the rotation angle of the reaction motor 3.

The cable-type column 10 is a mechanical backup mechanism that carries out a column shaft function for transmitting a torque in a backup mode in which the clutch 6 is engaged, and is diverted so as not to interfere with members that exist between the steering unit A and the steered unit B. The cable-type column 10 is structured such that two inner cables are wound around a steering wheel side cable reel 10a that is connected to the column shaft 2 and a pinion side cable reel 10b that is connected to a pinion shaft 21 in opposite directions to each other. The ends of these two inner cables are fixed to cable reels 10a and 10b, respectively, and both sides of outer tubes 10c and 10c in which the two inner cables are inserted are fixed to these two reel cases.

The steered unit B comprises steering mechanism 11, a resolver 16, a torque sensor 17, an encoder 18, steered side motors 20 and 20, the pinion shaft 21 and steering controlled wheels 22 and 22.

The steering mechanism 11 has a rack and pinion-type steering gear and steers the steering controlled wheels 22 and 22 in correspondence with the rotation of the pinion shaft 21. The steered side motors 20 and 20 are connected to the pinion shaft 21 via an attenuator such as a worm and worm wheels, etc., and steered side motors 20 and 20 output the steered torque for steering the steering controlled wheels 22 and 22 to the pinion shaft 21 in correspondence with the command current value from the controller 19.

The resolver 16 detects the motor rotation angle of the steered side motors 20 and 20. The torque sensor 17 detects the input torque to the pinion shaft 21. The encoder 18 detects the rotation angle of the pinion shaft 21.

Information detected by the steering wheel angle sensor 13, a torque sensor 14, the resolvers 15 and 16, the torque sensor 17 and the encoder 18 is inputted to the controller 19, so the controller 19 can drive and control the reaction motor 3 and the steered side motors 20 and 20 based on each of the sensor signals.

During the normal steer-by-wire control (in which the clutch 6 is released), the steering wheel angle sensor 13 detects the rotation angle of the steering wheel 1 and, based on the detected rotation angle, the controller 19 calculates the steering amount of the steering gear 11. The controller 19 outputs the command current value for driving the steered unit side motors 20 and 20 so that the steering mechanism 11 is driven. At this time, the torque sensor 17 detects the reaction force that is applied to the steering mechanism 11 and the command current value for driving the reaction motor 3 is outputted from the controller 19, so that the steering reaction force is applied to the steering wheel 1.

In the event of failure of the steer-by-wire system, the clutch 6 is engaged so as to mechanically connect the steering wheel 1 to the steering mechanism 11. At this time, the operation force of the steering wheel 1 is transmitted from the steering wheel 1, to the column shaft 2, the bevel gear 4, the clutch 6, the cable-type column 10 and the steering mechanism 11.

Description of the structure of the steering unit will be given below. FIG. 2 shows the steering unit A according to Embodiment 1. The steering unit A is provided inside a cabin space (a vehicle interior for a driver to drive the vehicle) which is sectioned from the front body (e.g., engine room) by a dash panel (bulkhead) 9. The bevel gear 4 and the clutch 6 are connected by a first shaft 5, and the clutch 6 and the steering wheel side cable reel 10a are connected by a second shaft 7. Because of the bevel gear 4, the direction of the rotation axis m of the steering wheel 1, the column shaft 2 and the reaction motor 3 is perpendicular to the rotation axis n of the first shaft 5, clutch 6 and the second shaft 7. In other words, the bevel gear 4 changes the rotation axis direction of the steering wheel 1 towards a direction along the dash panel 9. However, the angle formed by the direction of the rotation axis m and the direction of the rotation axis n is not limited to 90 degrees but may be greater or less than 90 degrees.

Figure 3:
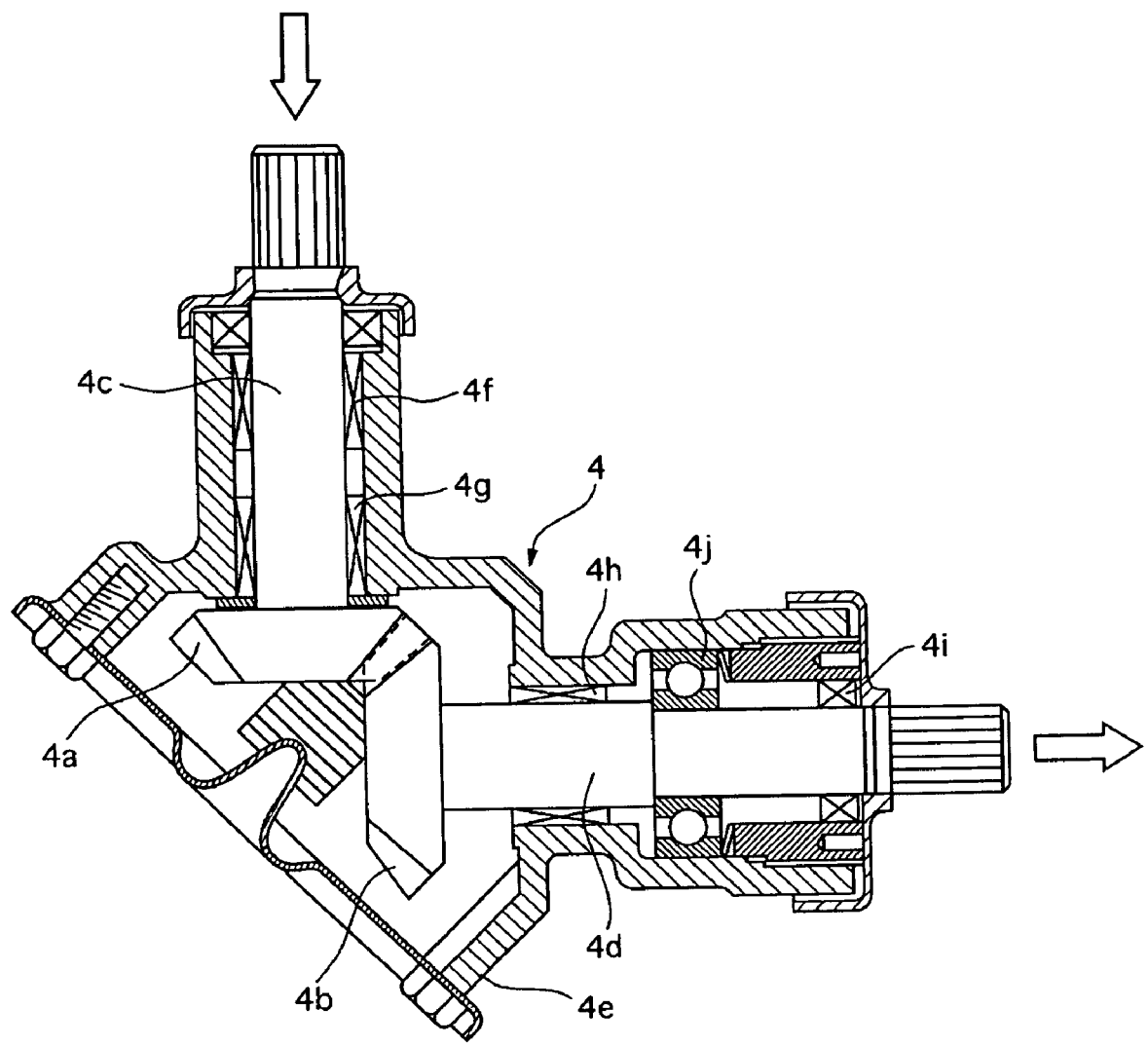
FIG. 3 is a cross-sectional view of a bevel gear according to Embodiment 1.

FIG. 3 is a cross-sectional view of the first bevel gear 4. The first bevel gear 4 comprises an input shaft 4c and an output shaft 4d. One end of the input shaft 4c is connected to the column shaft 2, and the other end thereof is connected to an input gear 4a. One end of the output shaft 4d is connected to an output gear 4b and the other end thereof is connected to the first shaft 5.

The input and output gears 4a and 4b are contained in a casing 4e. The input shaft 4c is supported by the casing 4e via two needle bearings 4f and 4g, and the output shaft 4d is supported by the casing 4e via two needle bearings 4h and 4i and a ball bearing 4j.

According to Embodiment 1, the size in the axis direction of the apparatus is reduced by converting the rotation axis direction. Description thereof will be given below.

Figure 4:
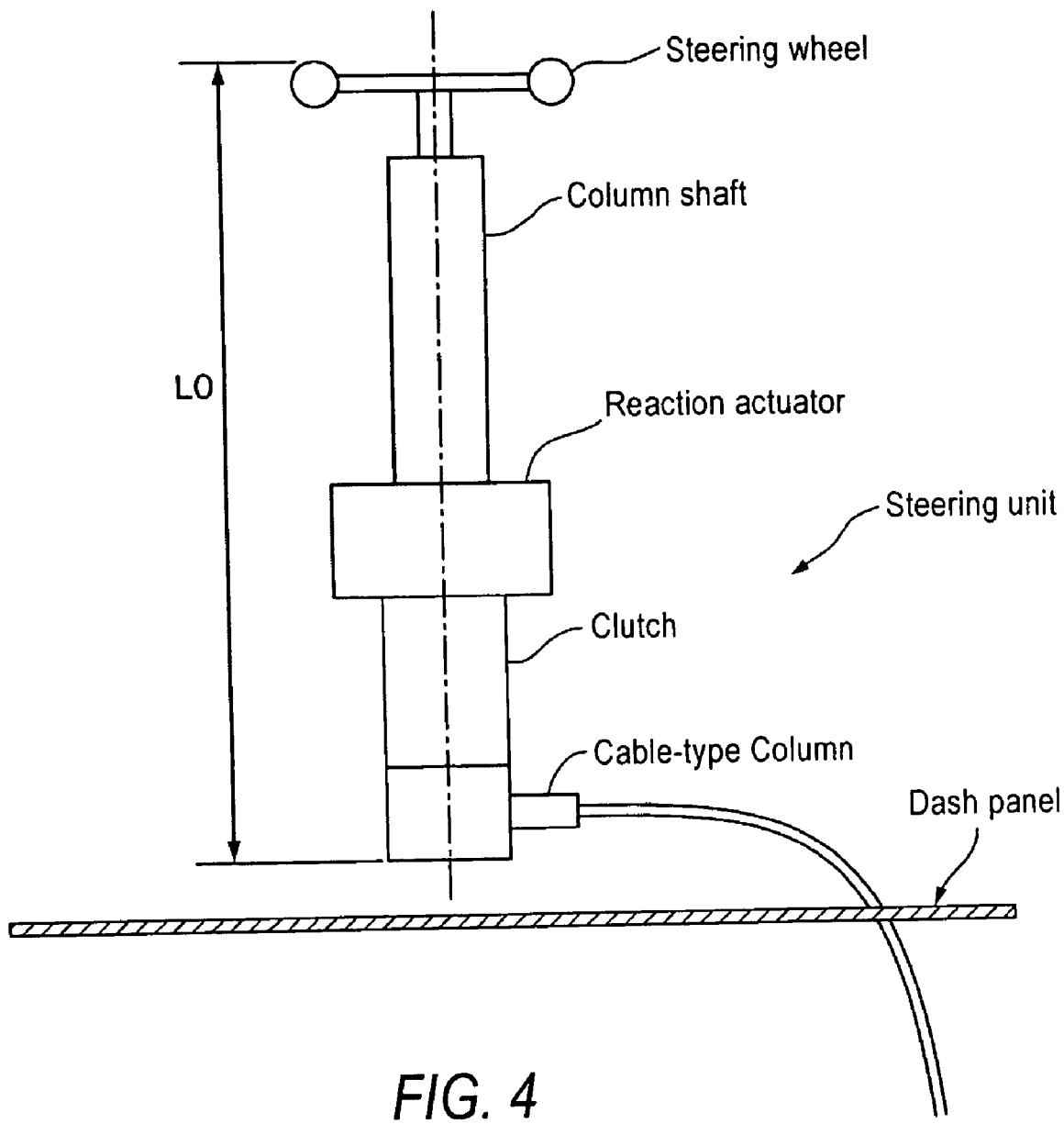
FIG. 4 shows the steering unit according to a conventional steer-by-wire system.

FIG. 4 shows a steering unit of a conventional steer-by-wire system. In such a conventional steering system, since a reaction motor, a clutch and a steering wheel side cable reel of the cable-type column are provided in series, in other words, coaxially on the axis of the column shaft that is connected to the steering wheel, the length in the axis direction L0 becomes necessarily long. In order to avoid interference with the dash panel (dashboard) and also in order to avoid an impact to the driver via the column shaft during a vehicle collision, it is desirable that the length of the steering unit in the axis direction be as short as possible.

In contrast, since in Embodiment 1, the bevel gear 4 that changes the direction of the rotation axis n of the clutch 6 is provided, so that the direction of rotational axis n of the clutch 6 is perpendicular to the direction of the rotation axis m of the steering wheel 1, the length L1 (FIG. 2) in the axis direction can be set shorter than the length L0 in the axis direction of the above-mentioned conventional steer-by-wire system. Consequently, the vehicle mountability can be improved and the freedom of the cabin space layout can be increased.

In addition, in Embodiment 1, since the bevel gear 4 is provided between the reaction motor 3 and the clutch 6, friction, etc., from the bevel gear 4 does not intervene with the steering reaction that is applied to the steering wheel 1 by the reaction motor 3, thereby avoiding any influence on the steering wheel 1, so that discomfort of steering can be prevented.

The vehicle steering apparatus according to Embodiment 1 has advantages set forth below.

(1) In the vehicle steering apparatus, the steering unit A having the steering wheel 1 and the reaction motor 3 and the steered unit B that steers the steering controlled wheels 22 and 22 can be mechanically separated from each other, and the clutch 6 that can mechanically connect the steering unit A and the steered unit 13. Further, the backup unit (cable-type column 10) is provided between the clutch 6 and the steered unit B and transmits the steering torque inputted from the steering wheel 1 to the steering controlled wheels 22 and 22 when the clutch 6 is engaged. The bevel gear 4 that changes the rotation axis direction of the steering wheel 1 to the rotation axis direction of the clutch 6 is provided between the reaction motor 3 and the clutch 6. Therefore, arrangement of the clutch 6 on the rotation axis of the steering wheel 1 is not needed thereby reducing the length L1 in the axis direction of the steering unit A, so that the vehicle mountability can be improved compared to the prior art. In addition, the bevel gear 4 is provided on the side of the steering controlled wheels 22 and 22 from the reaction motor 3, thereby preventing the discomfort of steering due to the friction, etc., by the bevel gear 4.

(2) The bevel gear 4 generates an output in the rotation axis direction of the clutch 6 at an approximate right angle relative to the rotation axis direction of the steering wheel 1, and therefore the freedom of layout can be increased thereby reducing the length of the steering unit A in the axis direction to the minimum.

(3) Since the backup unit comprises the cable-type column 10, and the clutch 6 transmits the rotation generated by the steering wheel 1 to the cable-type column 10 when the clutch 6 is engaged, the column shaft 2 can be prevented from moving into the cabin space upon a vehicle collision.

(4) The reaction motor 3 comprises a coaxial motor whose output shaft is coaxially provided with the column shaft 2 and therefore, the length of the column shaft 2 in the diameter direction can be reduced and also a high output motor can be used. In addition, even in the case where a large coaxial motor in the axis direction is employed, the length L1 in the axis direction can be shorter than in case where the output shaft of a motor is connected to the column shaft 2 via a worm & worm wheel, thereby increasing the freedom of layout.

Embodiment 2

Figure 5:
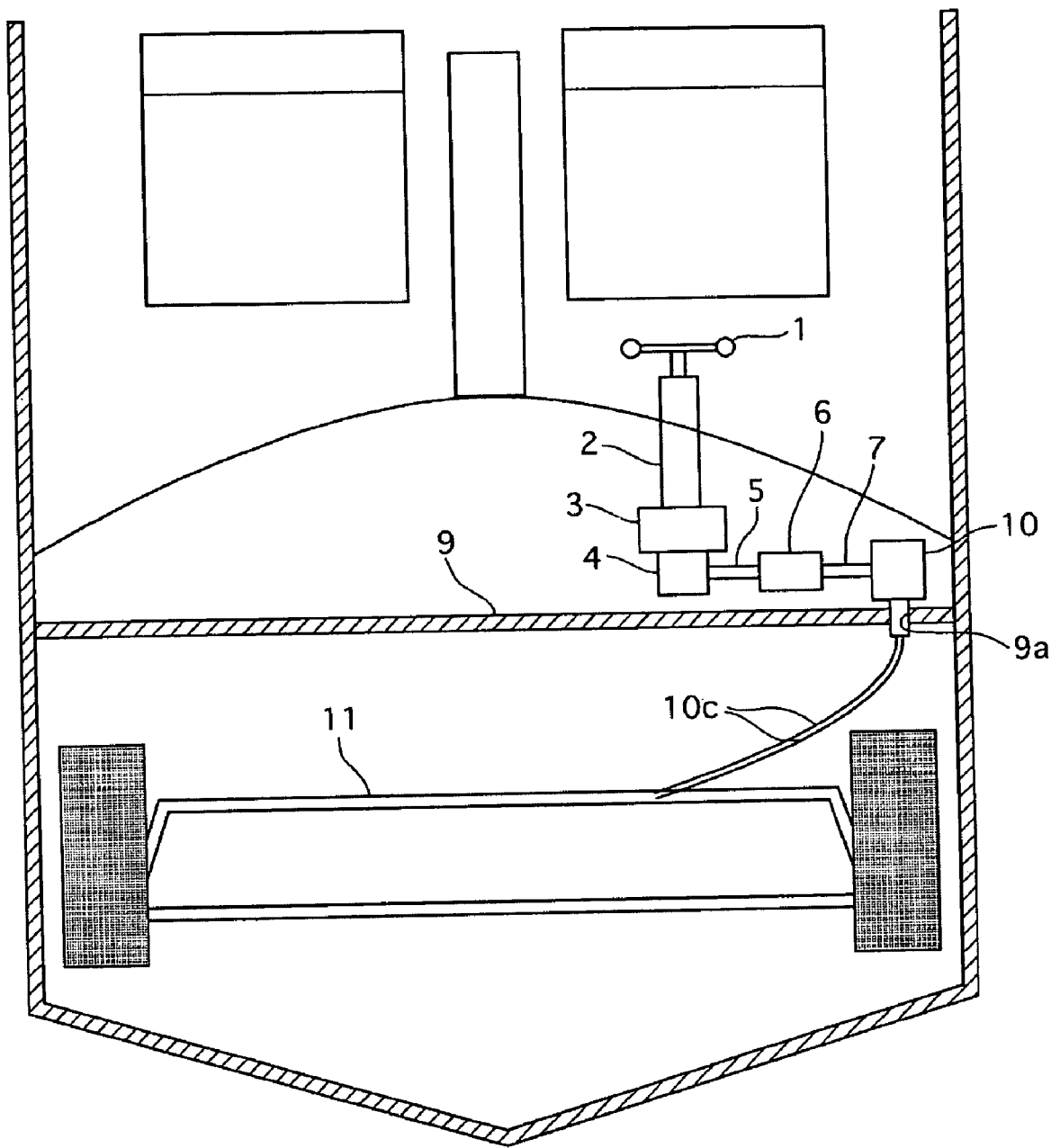
FIG. 5 is a schematic view of a steer-by-wire system in which the vehicle steering apparatus according to Embodiment 2 is applied.

FIG. 5 is a schematic view of a steer-by-wire system in which a steering apparatus for vehicle according to Embodiment 2 is applied. The bevel gear 4 according to Embodiment 2 is provided so that rotation of the steering wheel 1 is outputted in a width direction of the vehicle towards the outside of the vehicle. A communication hole 9a that allows the outer tubes 10c and 10c of the cable-type column 10 out of the cabin space is formed on the outside portion of the dash panel 9 in the vehicle width direction.

According to Embodiment 2, interference with members provided in the engine room can be avoided.

That is, since the rotation of the steering wheel 1 is outputted to the outside of the vehicle width direction by the bevel gear 4, the outer tubes 10c and 10c of the cable-type column 10 can be rerouted on a side portion of the vehicle so as not to easily intervene with the engine room members.

The vehicle steering apparatus according to Embodiment 2 has advantages set forth below, in addition to the advantages (1) to (4) of Embodiment 1 described above.

(5) Since the bevel gear 4 outputs the rotation of the steering wheel 1 towards the outside of the vehicle in a width direction of the vehicle, the outer tubes 10c and 10c of the cable-type column 10 can be led on the side portion of the vehicle when they are led from the inside to the outside of the cabin space, thereby easily avoiding any intervention with the engine room members.

Embodiment 3

Figure 6:
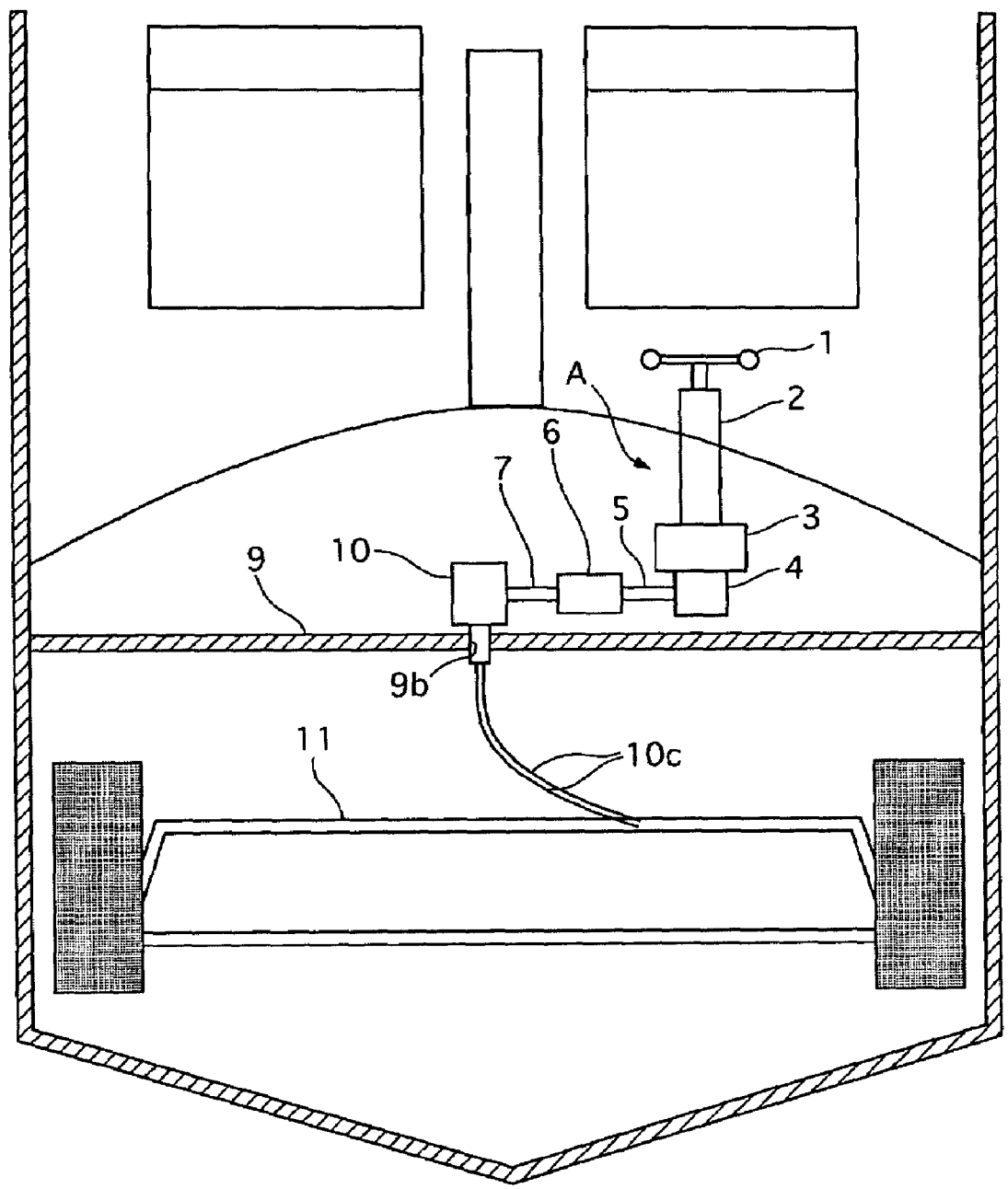
FIG. 6 is a schematic view of the steer-by-wire system in which a vehicle steering apparatus according to Embodiment 3 is applied.

FIG. 6 is a schematic view of a steer-by-wire system in which a steering apparatus for a vehicle according to Embodiment 3 is applied. The bevel gear 4 according to Embodiment 3 is provided so that the rotation of the steering wheel 1 is outputted towards the inside of the vehicle in a width direction of the vehicle. A communication hole 9b that allows the outer tubes 10c and 10c of the cable-type column to come out of the cabin space is formed at an approximate center position of the dash panel 9 in the width direction of the vehicle.

According to Embodiment 3, details of the dash panel are set forth below.

In Embodiment 2, the communication hole 9a is formed on the outside portion of the dash panel 9 in the width direction of the vehicle, and therefore two types of dash panels have to be prepared for a right-hand steering wheel vehicle and a left-hand steering wheel vehicle. Nonetheless, according to Embodiment 3, the communication hole 9b is formed at the approximate center location of the dash panel 9 in the width direction of the vehicle so that the dash pane 9 can be shared by both a right-hand steering wheel vehicle and a left-hand steering wheel vehicle thereby allowing a cost reduction.

The vehicle steering apparatus according to Embodiment 3 has advantages set forth below, in addition to the advantages (1) to (4) of Embodiment 1 described above.

(6) Since the bevel gear 4 outputs the rotation of the steering wheel 1 towards the inside of the vehicle in the width direction of the vehicle, the communication hole 9b provided at the approximate center of the dash panel 9 can be shared by both the left-hand and right-hand steering wheel vehicle.

Embodiment 4

Figure 7:
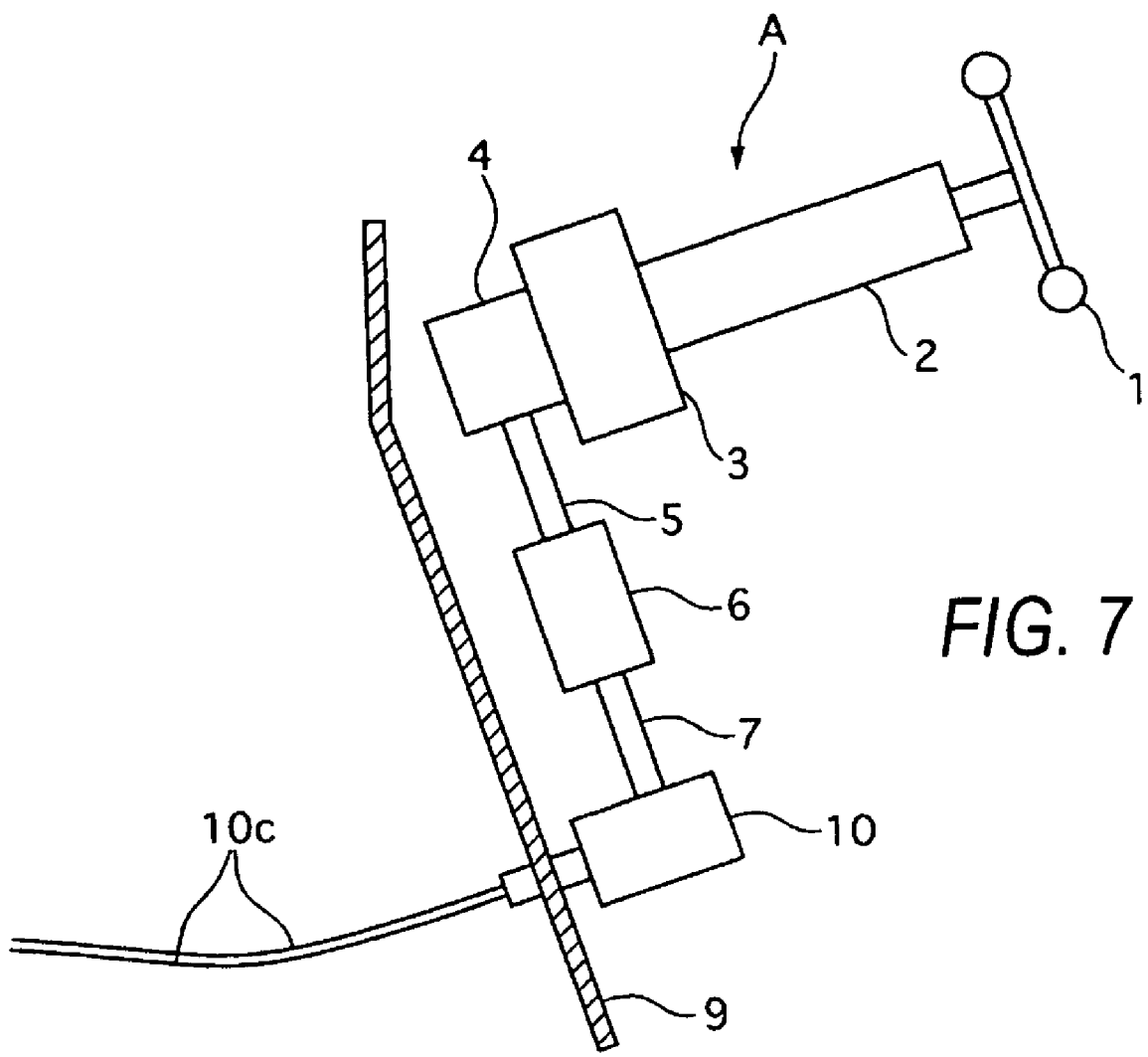
FIG. 7 is a schematic view of a steer-by-wire system in which the vehicle steering apparatus according to Embodiment 4 is employed.
Figure 8A:
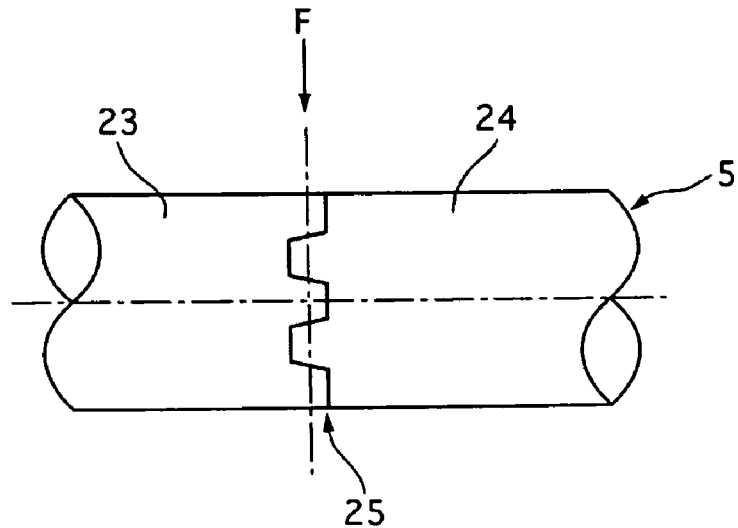
FIGS. 8A, 8B and 8C show the structure of a first shaft according to Embodiment 5 that connects a bevel gear and a clutch.
Figure 8B:
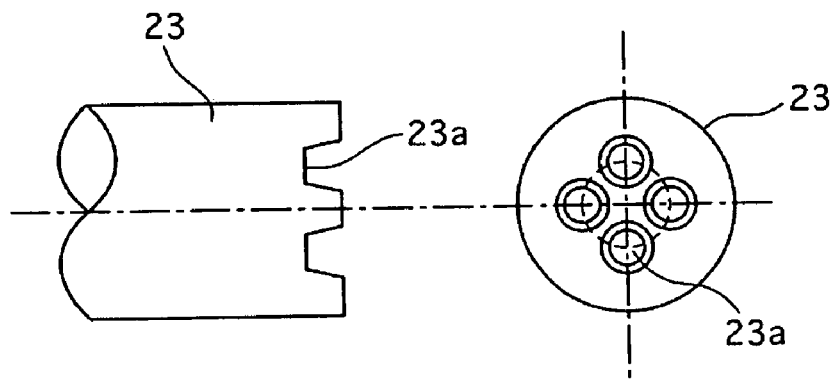
Figure 8C:
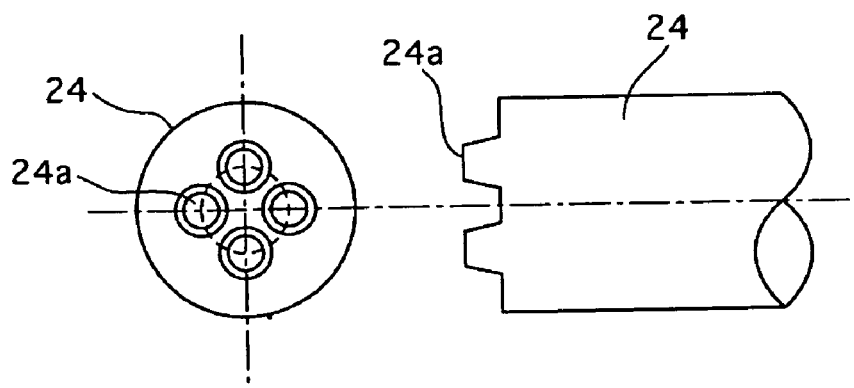

FIG. 7 is a schematic view of a steer-by-wire system in which a steering apparatus for a vehicle according to Embodiment 4 is employed. The bevel gear 4 is arranged so as to output the rotation of the steering wheel 1 in a downward direction of the vehicle.

According to Embodiment 4, interference with the members provided in the engine room can be avoided. That is, the bevel gear 4 outputs the rotation of the steering wheel 1 in the downward direction of the vehicle so that the outer tubes 10c and 10c of the cable-type column 10 can be rerouted on the bottom portion of the vehicle so as not to interfere with the engine room members.

The vehicle steering apparatus according to Embodiment 4 has advantages set forth below, in addition to the advantages (1) to (4) according to Embodiment 1.

(7) Since the bevel gear 4 outputs the rotation of the steering wheel 1 in the downward direction of the vehicle, the outer tubes 10c and 10c of the cable-type column 10 can be led on the bottom of the vehicle when they are led from the inside to the outside of the cabin space, thereby easily avoiding interference with the engine room members.

Embodiment 5

FIGS. 5A, 5B and 5C show the structure of the first shaft 5 according to Embodiment 5 in which the first shaft 5 connects the bevel gear 4 and clutch 6. The first shaft 5 comprises two members 23 and 24 provided in the lengthwise direction, and a joint 25 formed by connecting surfaces of these two members 23 and 24, in which the joint of the two members 23 and 24 are disengaged when a load F in a direction perpendicular to the axis direction is applied. At the joint 25, concave portions 23a are formed on the member 23 and corresponding convex portions 24a that engage with the concave portions 23a are formed on the member 24. At the joint 25, the concave portions 23a and the convex portions 24a that form a mating structure are disengaged when the load F in the direction perpendicular to the axis direction is applied.

Next, description of impact absorption upon a collision will be given below.

During a vehicle collision (in particular, a frontal collision), if an impact is transmitted from the steering wheel 1 to the column shaft 2, the reaction motor 3 the bevel gear 4, the column shaft 2 attempts to disengage from the steering unit A. However, in Embodiment 5, the first shaft 5 that connects the bevel gear 4 to the clutch 6 breaks and therefore the column shaft 2 comes off the members. In other words, if an impact is transmitted to the steering unit A, the first shaft 5 breaks and the steering unit A moves to a side of the dash panel 9 to maintain a distance between the steering wheel 1 and the driver and therefore, the impact to the driver is reduced. In addition, during a vehicle collision, if the dash panel 9 moves backwards first and then an impact occurs the same action will take place.

The vehicle steering apparatus according to Embodiment 5 has advantages set forth below, in addition to the advantages (1) to (4) of Embodiment 1.

(8) The first shaft 5 connects the bevel gear 4 to the clutch 6, and the first shaft 5 has the joint 25 at which the two members 23 and 24 are disengaged when the first shaft 5 receives a load from a direction intersecting with the axis direction, such as when the load F in the direction perpendicular to the axis direction is applied, and therefore the impact on the driver can be reduced during a vehicle collision.

(9) The joint 25 has the mating structure in which the two members 23 and 24 are disengaged when the load F in the direction perpendicular to the axis direction is applied and therefore it breaks only upon collision and the steering power can be securely transmitted to the steering controlled wheels 22 and 22 during the backup mode.

(10) Since at the joint 25, the member 23 has the concave shape 23a and the member 24 has corresponding convex shape 24a that engages with the concave shape 23a, the joint 25 that breaks upon collision can be constructed with a simple structure.

Figure 9:
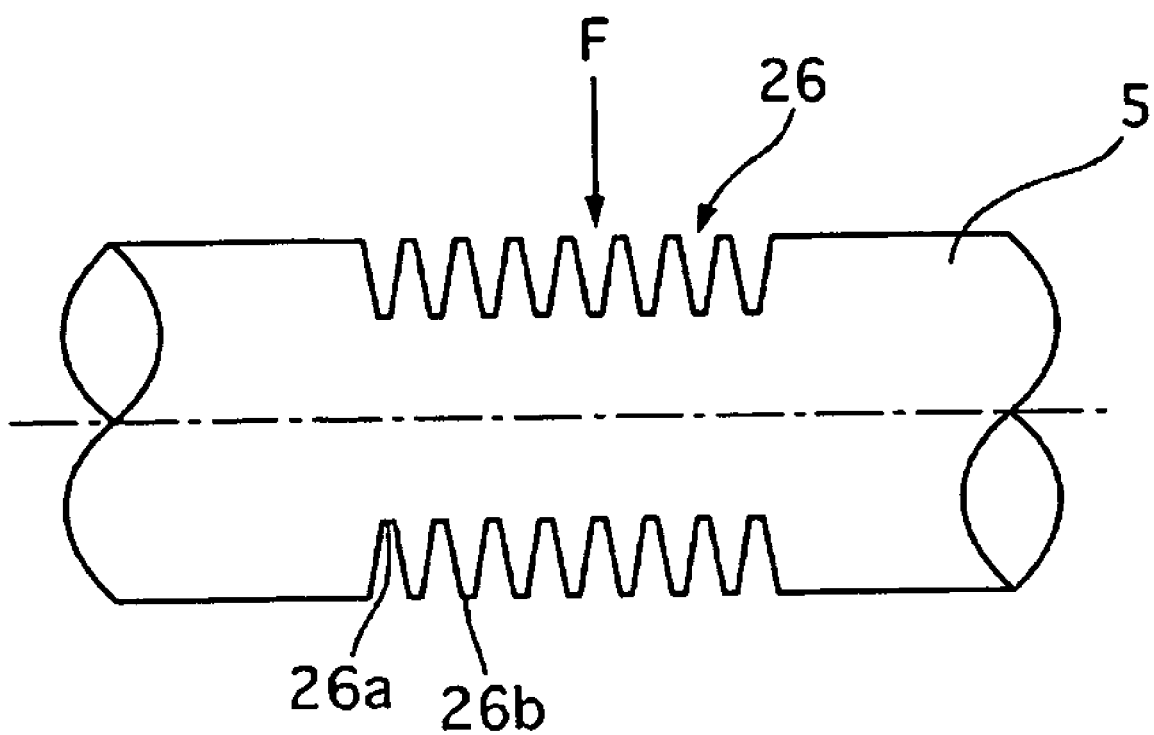
FIG. 9 shows the structure of a first shaft according to Embodiment 6.

FIG. 9 shows the structure of the first shaft 5 according to Embodiment 6. The first shaft 5 comprises a joint 26 in which small diameter portions 26a and large diameter portions 26b are provided in alternation, and this joint 26 is designed so that the small diameter portions 26a will break when the load F is applied in the direction perpendicular to the axis direction.

Since an operation of Embodiment 6 is the same as that of Embodiment 5, the description is omitted.

The vehicle steering apparatus according to Embodiment 6 has advantages set forth below, in addition to the advantages (1) to (4) of Embodiment 1.

(11) The joint 26 has a shape by which it folds when the load F in the direction perpendicular to the axis is applied, and therefore the impact on the driver can be reduced during a vehicle collision.

Embodiment 7

Figure 10A:
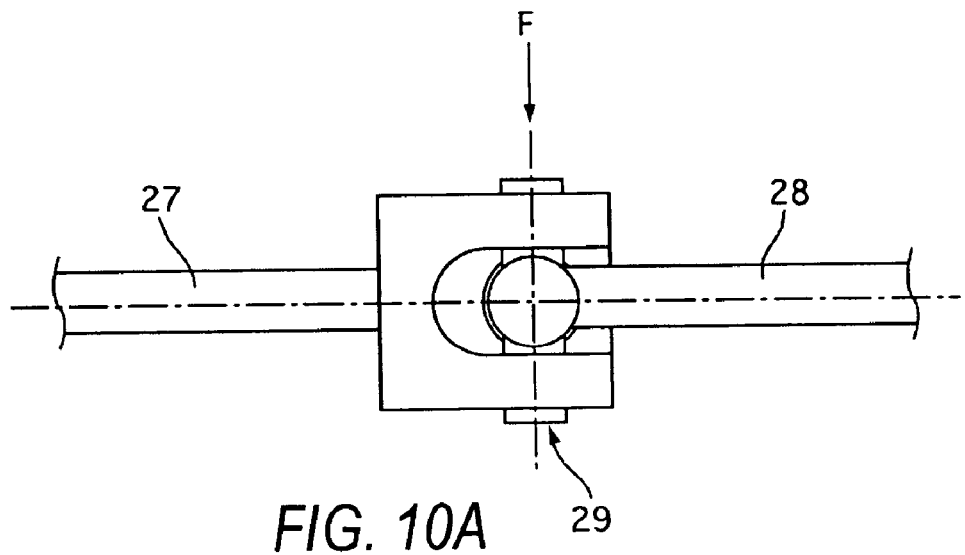
FIGS. 10A, 10B and 10C show the structure of a first shaft according to Embodiment 7.
Figure 10B:
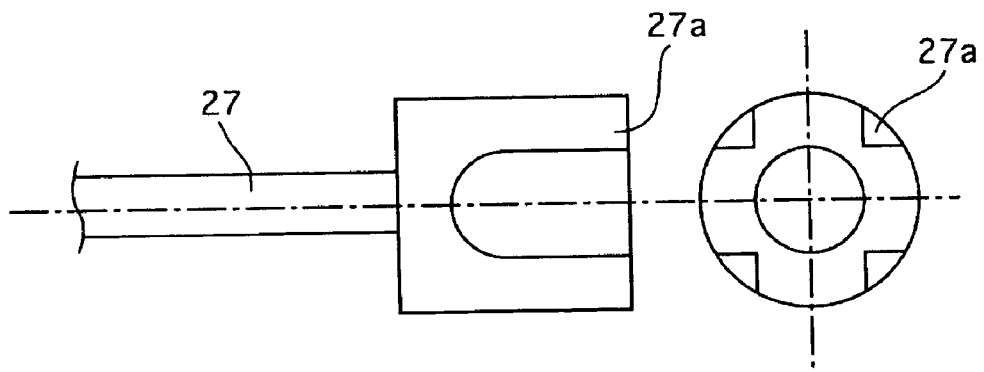
Figure 10C:
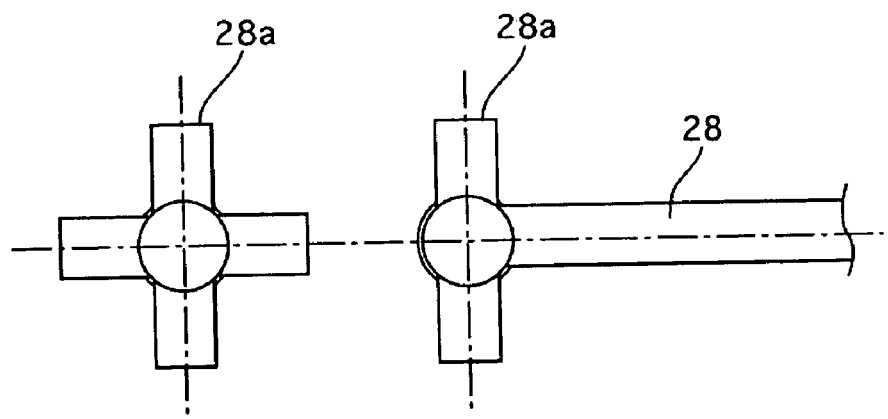

FIGS. 10A, 10B and 10C show the structure of the first shaft 5 according to Embodiment 7. The first shaft 5 comprises two members 27 and 28 in a longitudinal direction, and a joint 29 at which the two members 27 and 28 are disengaged when the load F in the direction perpendicular to the axis of the members 27 and 28 direction is applied. At the joint 29, the member 27 has an open shape 27a, which is a cross shaped recess, and a cross shaped projection 28a that generally corresponds to the open shape 27a is formed on the side of the member 28. This joint 29 has a mating structure in which the open shape 27a and the cross-shaped projection 28a are disengaged when the load F in the perpendicular direction is applied.

The operation of Embodiment 7 is the same as that of Embodiment 5 and therefore the description thereof is omitted.

The vehicle steering apparatus according to Embodiment 7 has advantages set forth below, in addition to the advantages (1) to (4) of Embodiment 1, and the advantage (8) of Embodiment 5.

(12) Since at the joint 29, the member 27 has the open shape 27a and the member 28 has the projected shape 28a that engages with the open shape 27a, the joint 29 that breaks upon collision can be constructed with a simple structure.

Embodiment 8

Figure 11:
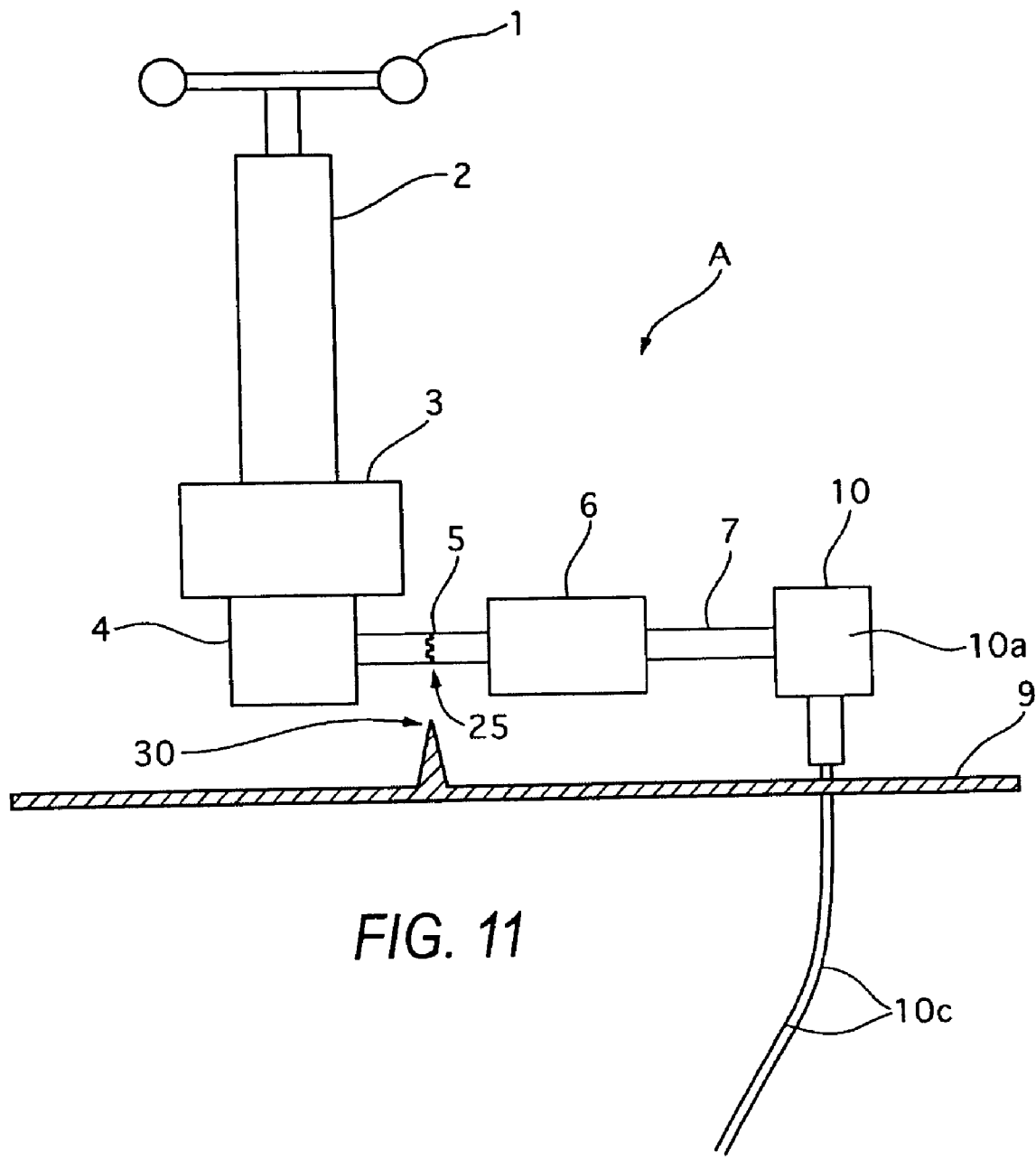
FIG. 11 is a schematic view of a steer-by-wire system to which the vehicle steering apparatus according to Embodiment 8 is employed.

FIG. 11 is a schematic view of a steer-by-wire system to which a steering apparatus for a vehicle according to Embodiment 8 is employed. In addition to the structure of Embodiment 5, Embodiment 8 comprises a projection 30 that promotes a break by coming into contact with the joint portion 25 when the steering unit A moves towards the front of the vehicle body, and which is provided on the dash panel 9 facing the joint 25.

According to Embodiment 8, dismantling of the steering unit upon a collision is promoted.

That is, upon a vehicle collision, the steering unit A moves towards the dash panel 9 and comes in contact with the projection 30 that is provided on the dash panel 9 and therefore the first shaft 5 is securely broken by the contact with the projection 30 so that the steering unit A can be dismantled.

The vehicle steering apparatus according to Embodiment 8 has advantages set forth below, in addition to the advantages (1) to (4) of Embodiment 1, and the advantage (8) of Embodiment 5.

(13) Since the projection 30 that applies a load to the joint 25 in the perpendicular direction is provided, a break of the first shaft 5 is promoted upon a collision so that the impact on the driver can be reduced.

(14) Since the projection 30 is provided on the dash panel 9 of the vehicle so as to face the joint 25, when the steering unit A comes close to the dash panel 9 upon a vehicle collision, it securely comes in contact with the first shaft 5 to break the first shaft 5, so that the steering unit A can be dismantled.

Embodiment 9

Figure 12:
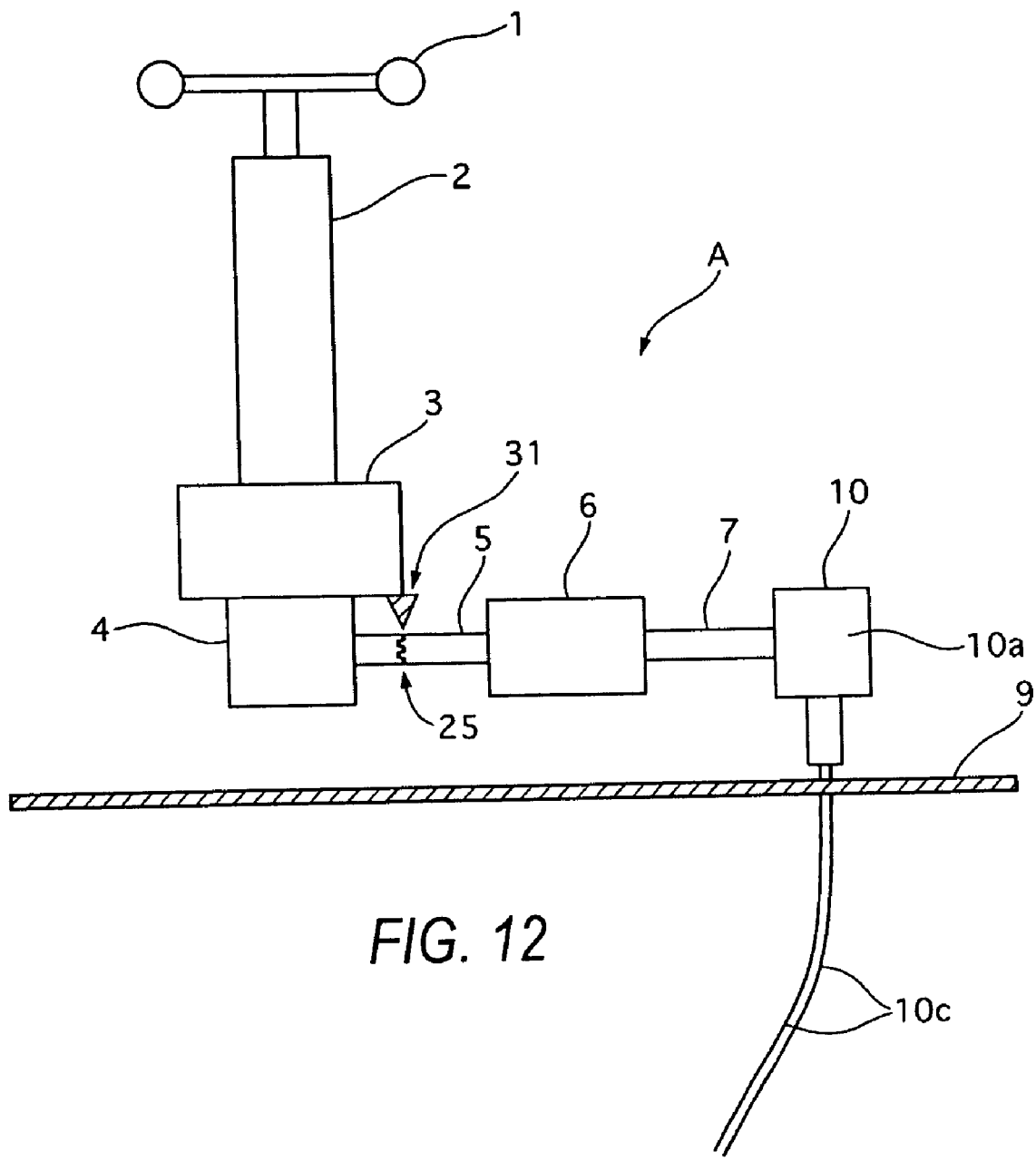
FIG. 12 is a schematic view of a steer-by-wire system to which the vehicle steering apparatus according to Embodiment 9 is applied.

FIG. 12 is a schematic view of a steer-by-wire system to which a steering apparatus for a vehicle according to Embodiment 9 is applied. Embodiment 8 is different from Embodiment 9 in that a projection 31 is provided so as to face the joint 25 provided on the steering unit A (a casing of the reaction motor 3). An operation of Embodiment 9 is the same as that of Embodiment 8 and a description thereof is omitted.

The vehicle steering apparatus according to Embodiment 9 has advantages set forth below, in addition to the advantages (1) to (4) of Embodiment 1, the advantage (8) of Embodiment 5, and the advantage (13) of Embodiment 8.

(15) Since the projection 31 is provided so as to face the joint 25 provided on the steering unit A, it securely comes in contact with the first shaft 5 during a collision, thereby breaking the first shaft 5, and the steering unit A can be dismantled.

Embodiment 10

Figure 13:
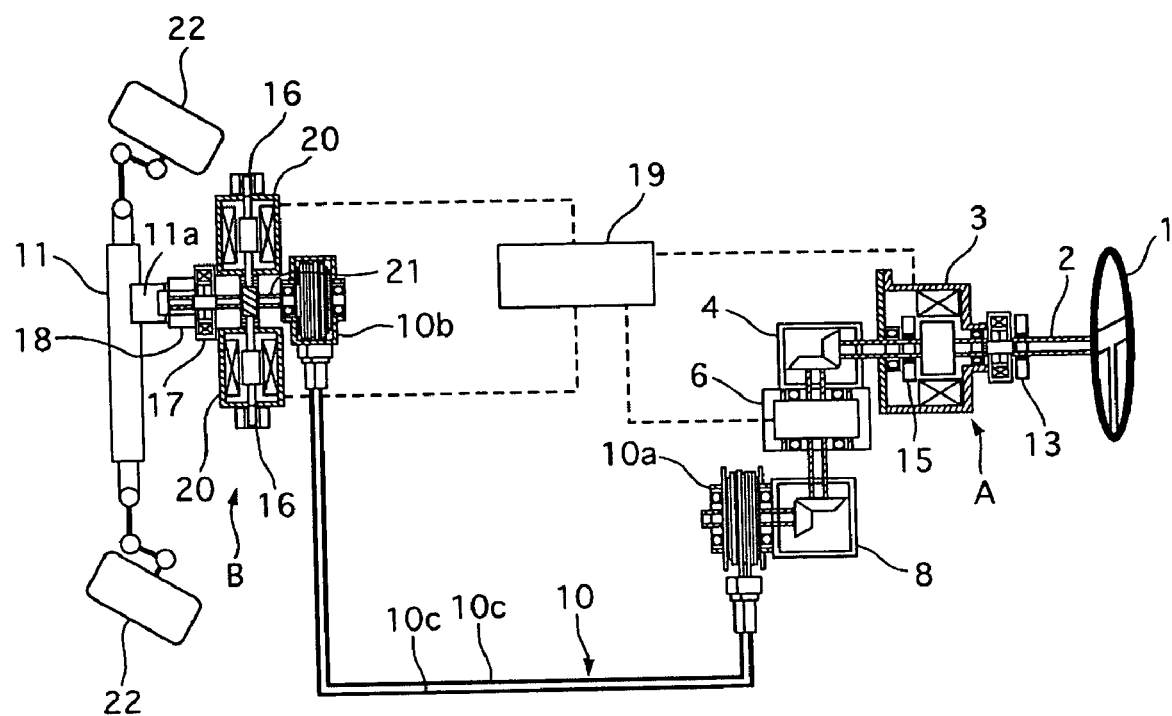
FIG. 13 is a schematic view of a steer-by-wire system in which the vehicle steering apparatus according to Embodiment 10 is applied.

FIG. 13 is a schematic view of a steer-by-wire system in which a steering apparatus for a vehicle according to Embodiment 10 is applied. The same numerals are assigned to the same structural elements as these of Embodiment 1. The vehicle steering apparatus according to Embodiment 10 comprises a steering unit A, a cable-type column (backup unit) 10, a steered unit B, and a controller 19. Each of the structures will be described below.

The steering unit A comprises a steering wheel (operation input unit) 1, a column shaft 2, a reaction motor 3, a first bevel gear (speed increasing unit) 4, a clutch 6, a steered side second bevel gear (speed decreasing unit) 8, a steering wheel angle sensor 13, and a resolver 15.

The reaction motor 3 is a coaxial motor, whose output axis is coaxial with the column shaft 2, and outputs a steering reaction torque that simulates a road surface reaction to the column shaft 2 according to a command current value from the controller 19. The first bevel gear 4 is provided between the reaction motor 3 and the clutch 6 and changes the rotation axis direction of the steering wheel 1 so that the rotational axis direction of the steering wheel 1 is different from the rotation shaft direction of the clutch 6 (axis direction of the column shaft 2).

Figure 14:
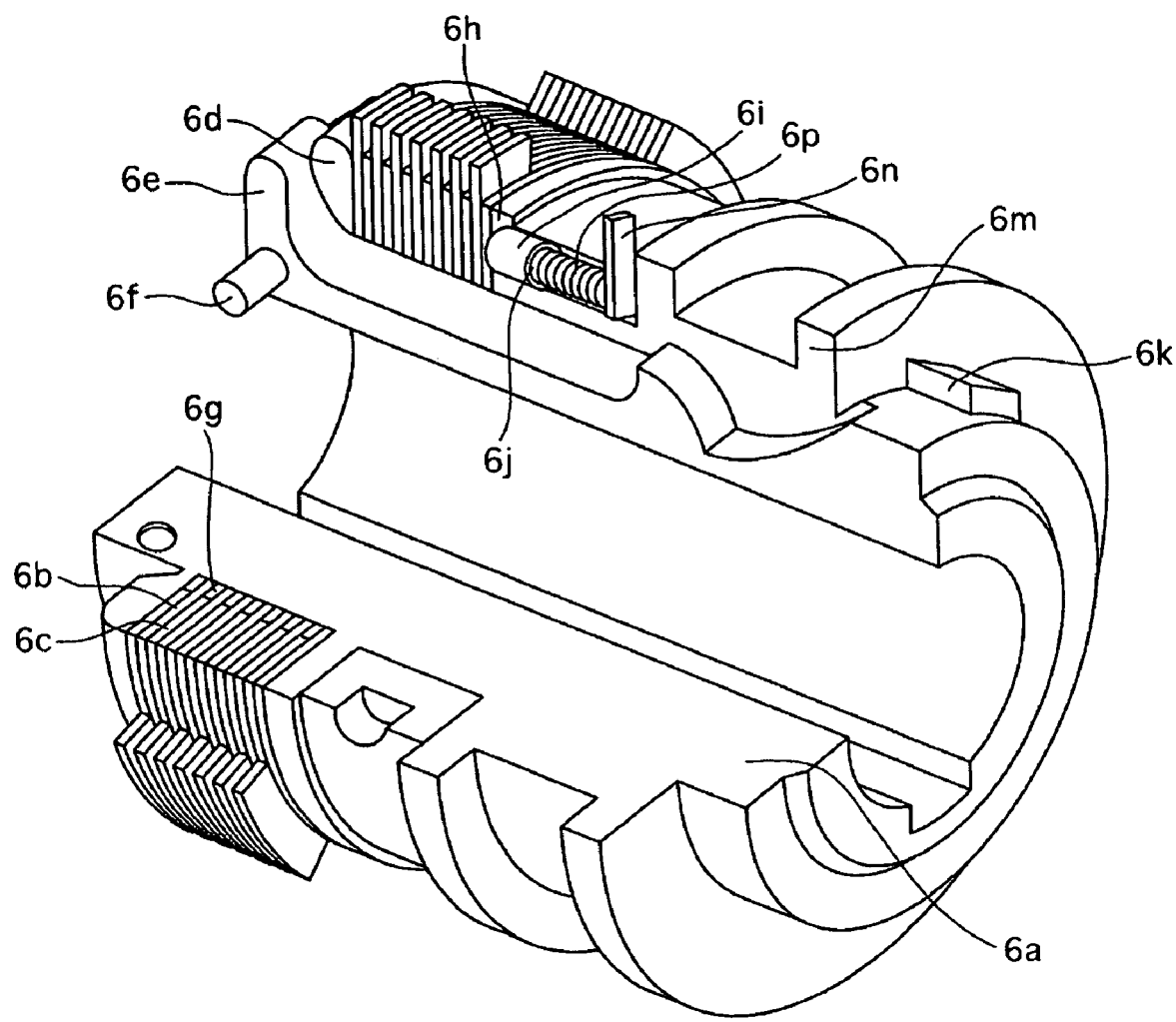
FIG. 14 shows a wet type multiple disk according to Embodiment 10.

The clutch 6 is provided between the column shaft 2 and the cable-type column 10. In Embodiment 10, a wet-type multiple disk clutch as shown in FIG. 14 is used. In FIG. 14, the clutch 6 comprises the main body 6a, an inner disk 6b, an outer disk 6c, a pressure plate 6d, a lever 6e, a lever pin 6f, a release spring 6g, an adjustment plate 6h, a locking pin 6i, a nut 6j, a parallel key 6k, a shifter pulley 6m, a locking plate 6n, and a locking pin spring 6p.

In the event of failure of the steer-by-wire system, the clutch 6 is engaged so as to mechanically connect the steering wheel 1 to the steering mechanism 1. At this time, the operation force of the steering wheel 1 is transmitted from the steering wheel 1 to the column shaft 2, the first bevel gear 4, the clutch 6, the second bevel gear 8, the cable-type column 10 and the steering mechanism 11.

Next, the structure of the steering unit A will be described below.

Figure 15:
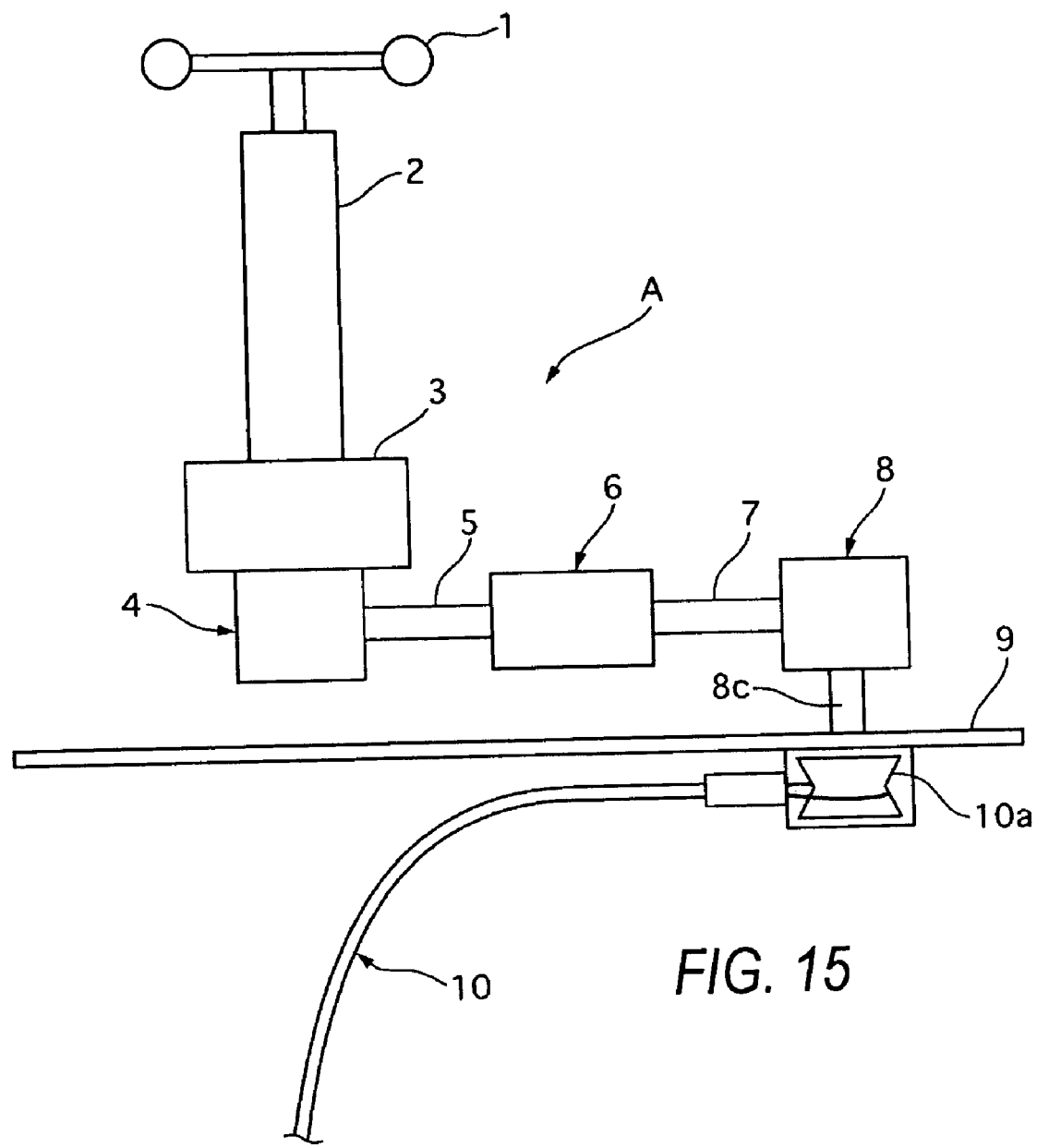
FIG. 15 shows the detailed structure of a steering unit according to Embodiment 10.

As shown in FIG. 15, the steering unit A is provided inside the cabin space which is sectioned from the engine room of the vehicle body by a dash panel 9. The first bevel gear 4 and the clutch 6 are connected by a first shaft (rotation shaft) 5, and the clutch 6 and the second bevel gear 8 are connected by a second shaft (rotation shaft) 7. The second bevel gear 8 and the steering wheel-side cable reel 10a are connected by a third shaft (rotation shaft) 8c.

Figure 16:
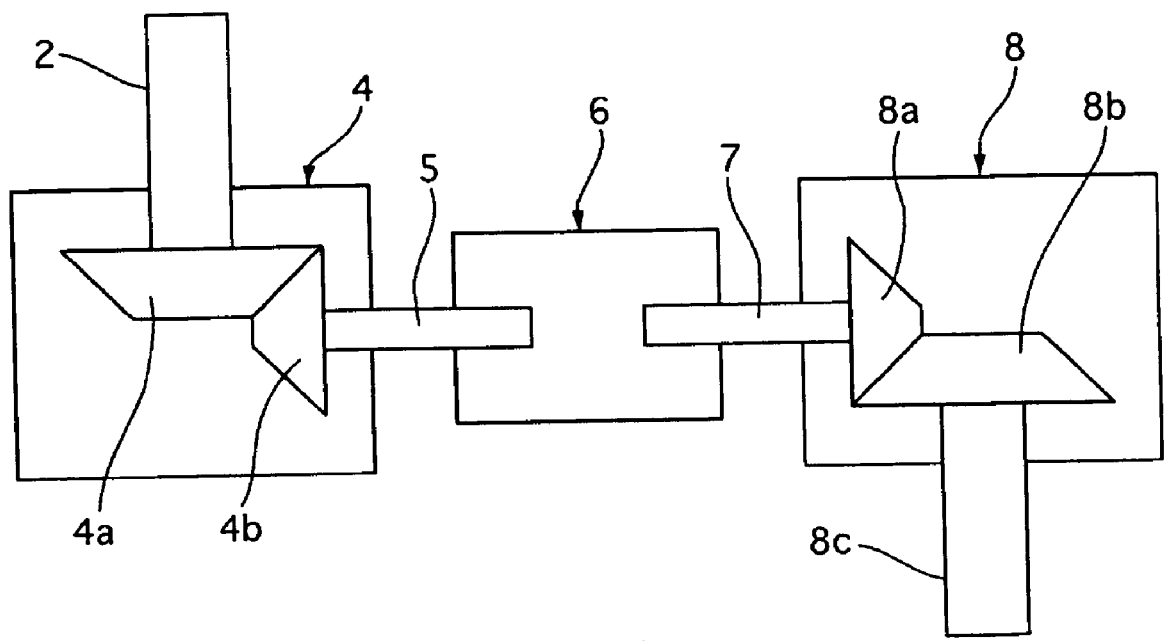
FIG. 16 is a schematic view of the first bevel gear, the clutch and a second bevel gear.

FIG. 16 is a schematic view of the first bevel gear 4, the clutch 6 and the second bevel gear 8.

The first bevel gear 4 comprises an input gear 4a and an output gear 4b. The input gear 4a is connected to the column shaft 2 (output shaft or the reaction motor 3), and the output gear 4b is connected to the first shaft 5. The axial direction of rotation inputted to the column shaft 2 is changed to by a right angle in the direction of the vehicle width by the rotation direction conversion function of the first bevel gear 4, and the rotation is inputted to the clutch 6 via the first shaft 5. The first shaft 5 is formed so as to have a smaller diameter than the column shaft 2 and the third shaft 8c.

The second bevel gear 8 comprises an input gear 8a and an output gear 8b. The input gear 8a is connected to the second shaft 7 and the output gear 8b is connected to the third shaft 8c. The axial direction of the rotation inputted to the second shaft 7 from the clutch 6 is converted by a right angle in the longitudinal direction of the vehicle by the rotation direction conversion function of the second bevel gear 8, and the rotation is inputted to the steering wheel-side cable reel 10a of the cable-type column 10 via the third shaft 8c. The second shaft 7 is similar to the first shaft 5, formed so as to have a smaller diameter than the column shaft 2 and the third shaft 8c.

In addition, since the structures of the first bevel gear 4 and the second bevel gear 8 are the same as those of the bevel gear 4 shown in FIG. 3, description thereof is omitted.

Where the number of gears of the input gears 4a and output gears 4b of the first bevel 4 is Z1 and Z2, respectively, and the number of gears of the input gears 8a and output gears 8b of the second bevel gear 8 is Z1' and Z2', respectively, the correlation between the number of gears satisfies a formula (1) set forth below.

$$Z1/Z2 = Z2'/Z1' \tag{1}$$

Wherein $Z1 > Z2$, $Z1' < Z2'$

In other words, the first bevel gear 4 outputs the rotation of the column shaft 2 to the clutch 6, by increasing its speed, and the second bevel gear 8 outputs the rotation of the clutch 6 to the cable-type column 10 by decreasing its speed. In addition, the rotation speed of the column shaft 2 and the input rotation of the cable-type column 10 are identical.

Description of torque capacity reduction of the clutch will be given below.

In the event of failure of the steer-by-wire system, the clutch 6 is engaged, and the steering force of the steering wheel 1 is transmitted in order from the column shaft 2→the first bevel gear 4→the clutch 6→the second bevel gear 8→the cable-type column 10→the steering mechanism 11. The road surface reaction from the steering controlled wheels 22 and 22 is transmitted in order from the steering mechanism 11→the cable-type column 10→the second bevel gear 8→the clutch 6→the first bevel gear 4→the column shaft 2→the steering wheel 1.

According to Embodiment 10, the first bevel gear 4, which is a speed increasing gear, is provided on the steering wheel side of the clutch 6, and the second bevel gear 8, which is a speed decreasing gear, is provided on the side of the steering mechanism 11 from the clutch 6 and therefore the torques (steering force by the driver and road surface reaction) that are added to the clutch 6 become smaller than the input to the first bevel gear 4 and the output from the second bevel gear 8. Consequently, the torque capacity of the clutch 6 can be reduced to the minimum.

In addition, according to Embodiment 10, since the first bevel gear 4 is used so that the rotation shafts 5 and 7 that are on the side of the front wheels 22 and 22 from the reaction motor 3 can be shifted from the axis of the column shaft 2 by the first bevel gear 4, the length of the steering unit A in the longitudinal direction of the vehicle can be reduced.

Description of simplification of dismantling upon collision will be described below.

According to Embodiment 10, the torque transmitted to the first shaft 5, which connects the first bevel gear 4 and the clutch 6, and the second shaft 7, which connects the clutch 6 and the second bevel gear 8, are small, thereby achieving reduction in weight by the first shaft 5 and the second shaft 7 having a small diameter. Therefore, disengagement of the first shaft 5 and the second shaft 7 upon collision of the vehicle becomes easy. Consequently, upon collision of the vehicle, if an impact occurs to the steering unit A, the first shaft 5 or the second shaft 7 is broken and the steering unit A moves towards the side of dash panel 9, thereby maintaining the distance between the steering wheel 1 and the driver so that the impact to the driver is reduced.

During a normal steer-by-wire control operation, the first bevel gear 4 and the first shaft 5 are rotated with the steering wheel 1, and the second shaft 7, the second bevel gear 8 and the cable-type column 10 are rotated with the steering mechanism 11. In particular, since the responsiveness, etc., of the reaction control directly affects the feeling of steering and therefore, it is desirable for the friction and inertia of the drag torque to be small.

According to Embodiment 10, the clutch 6 has a small capacity and the first shaft 5 and the second shaft 7 are light in weight and therefore the influence of the drag torque can be reduced to the minimum thereby increasing the response of the reaction control and steering control. In addition, since the first bevel gear 4 is provided between the reaction motor 3 and the clutch 6, it is possible to prevent the friction of the first bevel gear 4 from interfering with the steering reaction that is added to the steering wheel 1 by the reaction motor 3, and consequently, a discomfort of the steering can be prevented.

According to Embodiment 10, since the first bevel gear 4 that converts the axis direction of the rotation shaft of the steering wheel 1 so that the axis direction of the rotation shaft of the clutch 6 is the width direction of the vehicle, is provided, the length of the steering unit in the axis direction can be set shorter than the length in the axis direction of the above-mentioned prior art. Consequently the vehicle mountability is improved and the freedom of the layout in the cabin space can be increased.

The vehicle steering apparatus according to Embodiment 10 has advantages set forth below.

(16) In the vehicle steering apparatus, the steering unit A having the steering wheel 1 and the steered unit B that steers the steering controlled wheels 22 and 22 can be mechanically separated. Further, the apparatus comprises the backup unit (cable-type column 10) that mechanically transmits the rotation from the steering unit A to the steered unit B and the clutch 6 that carries out connection and disconnection of the backup unit, wherein a first bevel gear 4 is provided on the rotation shaft (first shaft 5) between the steering unit A and the clutch 6, and increases the output rotation to the clutch 6, and the second bevel gear 8 that is provided on the rotation shaft (second shaft 7) between the clutch 6 and the steered unit B, and that decreases the output rotation to the steered unit B. Therefore the torque added to the clutch 6 can be reduced relative to the input to the first bevel gear 4 and the output from the second bevel gear 8, and consequently the torque capacity of the clutch 6 can be limited to the minimum.

(17) The first bevel gear 4 has a rotation direction conversion function for changing the rotation axis direction of the steering wheel 1 so that the axis direction of the steering wheel 1 is different from the rotation axis direction of the clutch 6, and therefore the length in the axis direction of the steering unit A (length in the longitudinal direction of the vehicle (front and back direction)) can be set to be short. Consequently, the vehicle mountability is improved and the freedom of the layout in the cabin space can be increased. In addition, the friction of the rotation torque of the clutch during steering can be reduced to the minimum thereby improving the response of the reaction control.

(18) The second bevel gear 8 has a rotation direction conversion function for changing the input direction to the backup means with respect to the rotation axis direction of the steering wheel 1. That is, the rotation axis direction of the clutch 6, which has been changed by the first bevel gear 4, is changed by the second bevel gear 8 so that the rotation direction inputted to the backup unit is returned to the direction approximately parallel to the column shaft 2.

(19) Since the diameter of the first shaft 5 between the first bevel gear 4 and the clutch 6 is smaller than the diameter of the column shaft 2 between the first bevel gear 4 and the steering wheel 1, the inertia due to the drag torque during steering can be reduced to the minimum thereby improving the response of the reaction control. In addition, disconnection upon collision is easy and therefore the impact on the driver upon collision can be reduced.

(20) Since the diameter of the second shaft 7 between the second bevel gear 8 and the clutch 6 is smaller than the diameter of the third shaft 8*c* between the second bevel gear 8 and the steered unit B, the inertia due to the drag torque during steering can be reduced to the minimum thereby improving the response of the steering control. In addition, disconnection upon collision is easy and therefore the impact on the driver upon collision can be reduced.

(21) Since the clutch 6 is a friction clutch, a misengagement during the engagement of the clutch can be prevented compared to the case of a dog clutch.

Embodiment 11

Embodiment 11 is an example in which the increased rotation speed by the first bevel gear is reduced by the cable-type column.

Figure 17:
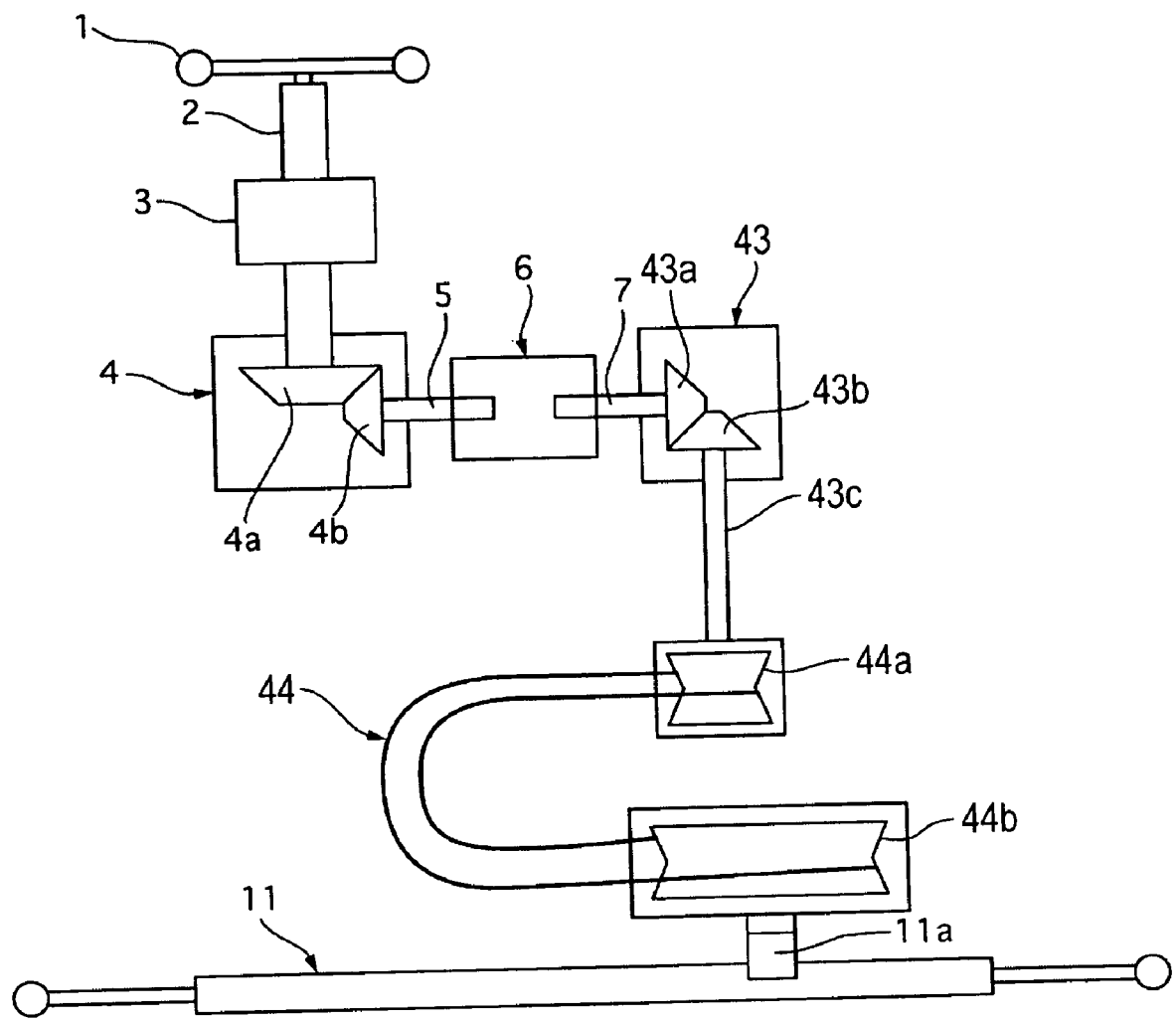
FIG. 17 is a schematic view of a vehicle steering apparatus according to Embodiment 11.

FIG. 17 is a schematic view of a vehicle steering apparatus according to Embodiment 11. Since the structure of Embodiment 11 is identical to Embodiment 10, the same numerals of Embodiment 10 are used for Embodiment 11, and the description thereof is omitted.

According to Embodiment 11, the number of gears of the input gear 43*a* of the second bevel gear 43 is the same as that of the output gear 43*b*, and the gear ratio is one to one.

Since the reel diameter of a steering wheel-side cable reel 44*a* of a cable-type column 44 is set so as to be smaller than that of a pinion-side cable reel 44*b*, the increased rotation number inputted from the first bevel gear 4 by the steering comes back to the original rotation number (decreasing speed device).

When the number of gears of the input gears 4*a* of the first bevel gear and that of the output gears 4*b* are Z1 and Z2, respectively, and the reel diameter of the steering wheel side cable reel 44*a* and that of the pinion side cable reel 44*b* are d1 and d2, respectively, the correlation between the numbers of gears and the reel diameters satisfies the formula (2) set forth below.

$$Z1/Z2=d2/d1 \qquad (2)$$

Wherein Z1>Z2, d2>d1

In Embodiment 11, the diameter of the third shaft 43c that connects the second bevel gear 43 to the steering wheel-side cable reel 44a of the cable-type column 44 is smaller (the same diameter as the first shaft 5 and second shaft 7) than that of the column shaft 2.

According to Embodiment 11, a control response can be improved. That is, since Embodiment 11 has a structure such that the rotation speed increased by the first bevel gear 4 is reduced by the cable-type column 44, the third shaft 43c as well as the first shaft 5 and the second shaft 7 becomes light in weight thereby allowing a reduction of the drag torque, so that the response of the steering control can be improved.

The vehicle steering apparatus according to Embodiment 11 has advantages set forth below.

(22) The backup unit is the cable-type column 44 that transmits the input steering torque inputted by the steering wheel 1 to the steering controlled wheels 22 and 22 by the two cables upon the engagement of the clutch 6. In the speed decreasing device, the reel diameter of the steering wheel-side cable reel 44a of the cable-type column 44 is smaller than that of the pinion-side cable reel 44b. Therefore the third shaft 43c that connects the second bevel gear 43 to the steering-side cable reel 44a of the cable-type column 44 can be light in weight thereby reducing the inertia of the drag torque during the steering to a minimum.

Embodiment 12

Embodiment 12 is an example in which the amount of increased rotation speed by a first bevel gear is reduced by a speed decreasing gear that is provided between a cable-type column and a steering mechanism.

Figure 18:
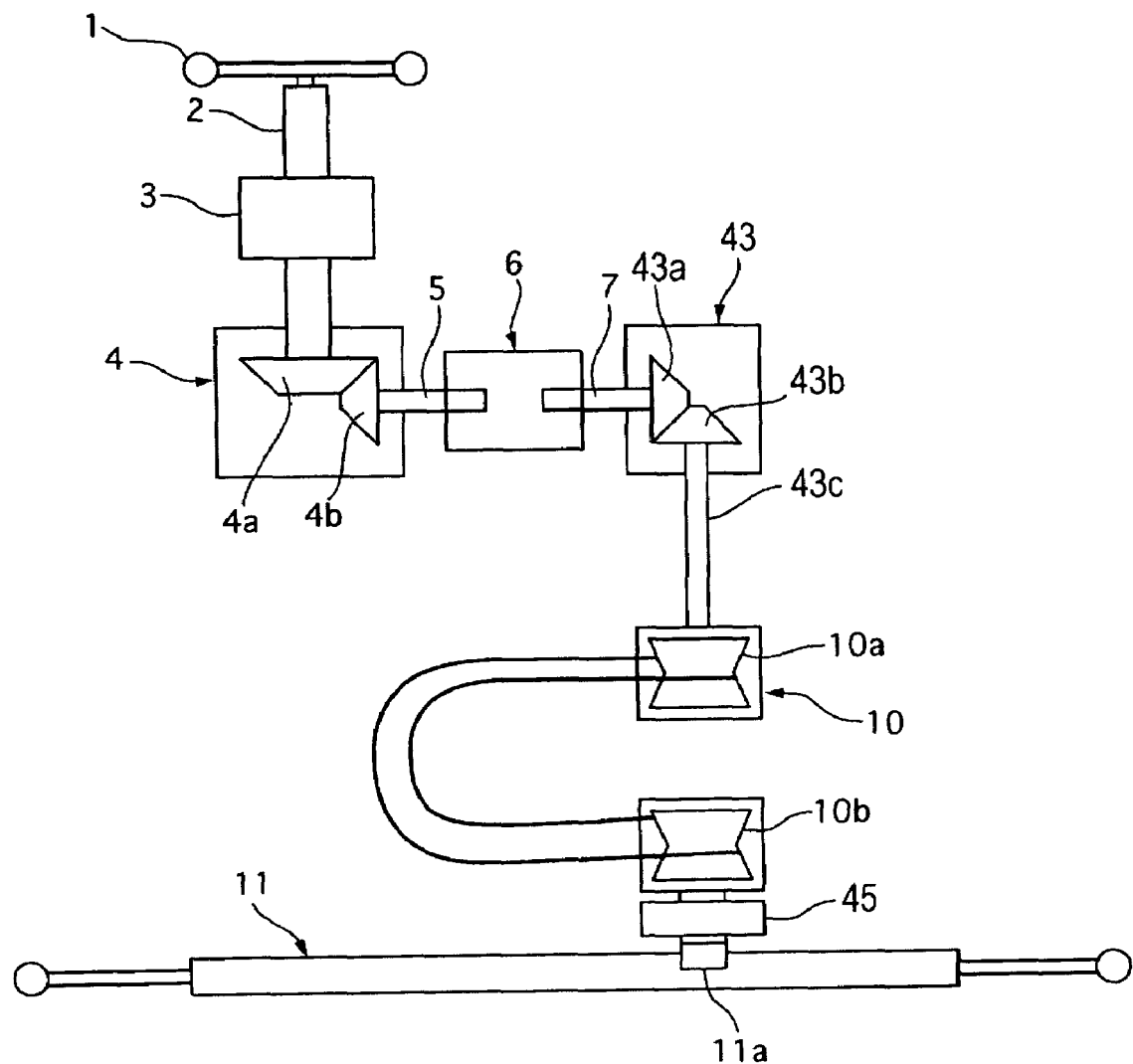
FIG. 18 is a schematic view of a vehicle steering apparatus according to Embodiment 12.

FIG. 18 is a schematic view of a vehicle steering apparatus according to Embodiment 12. The same numerals are assigned to the same structural elements as those of Embodiment 10 or 11. The description thereof is omitted.

According to Embodiment 12, a speed decreasing gear (speed decreasing unit) 45 is provided between the pinion-side cable reel 10b of the cable-type column 10 and the steering mechanism 11. The gear ratio of the speed decreasing gear 45 (decreased speed ratio) is set so that the rotation number increased by the first bevel gear 4 may come back to the original rotation number.

When the gear ratio of the speed decreasing gear is Z3, the number of gears of the input gears 4a of the first bevel gear 4 and that of the output gears 4b thereof is Z1 and Z2, respectively, then Z3 satisfies the formula (3) set forth below.

$$Z3=Z2/Z1 \qquad (3)$$

Wherein Z1>Z2

According to Embodiment 12, the cable friction can be reduced. That is, since the speed decreasing gear 45 that decreases the rotation speed that has been increased by the first bevel gear 4, is provided between the cable-type column 10 and steering mechanism 11, the torque that was added to the cable-type column 10 is reduced, so that the cable friction can be limited. Consequently, feeling of steering while the clutch is engaged is improved and the durability of the cable-type column 10 can be realized.

In addition, since the torque added to the cable-type column 10 can be reduced, the diameter of the steered-side cable reel 10a and the pinion-side cable reel 10b can be small so as to be light in weight, and therefore the inertia of the dragged torque can be limited to the minimum.

The vehicle steering apparatus according to Embodiment 12 has advantages set forth below.

(23) The speed decreasing gear 45 connects the cable-type column 10 to the steering mechanism 11 of the steered unit B so that the torque added to the cable-type column 10 can be reduced, and the cable friction can be limited. Consequently, feeling of steering while the clutch is engaged can be improved and the durability of the cable-type column 10 can be realized.

Embodiment 13

Embodiment 13 is an example in which a steering gear having a steering mechanism is used as a speed decreasing unit that decreases the rotation number that has been increased by the first bevel gear.

Figure 19:
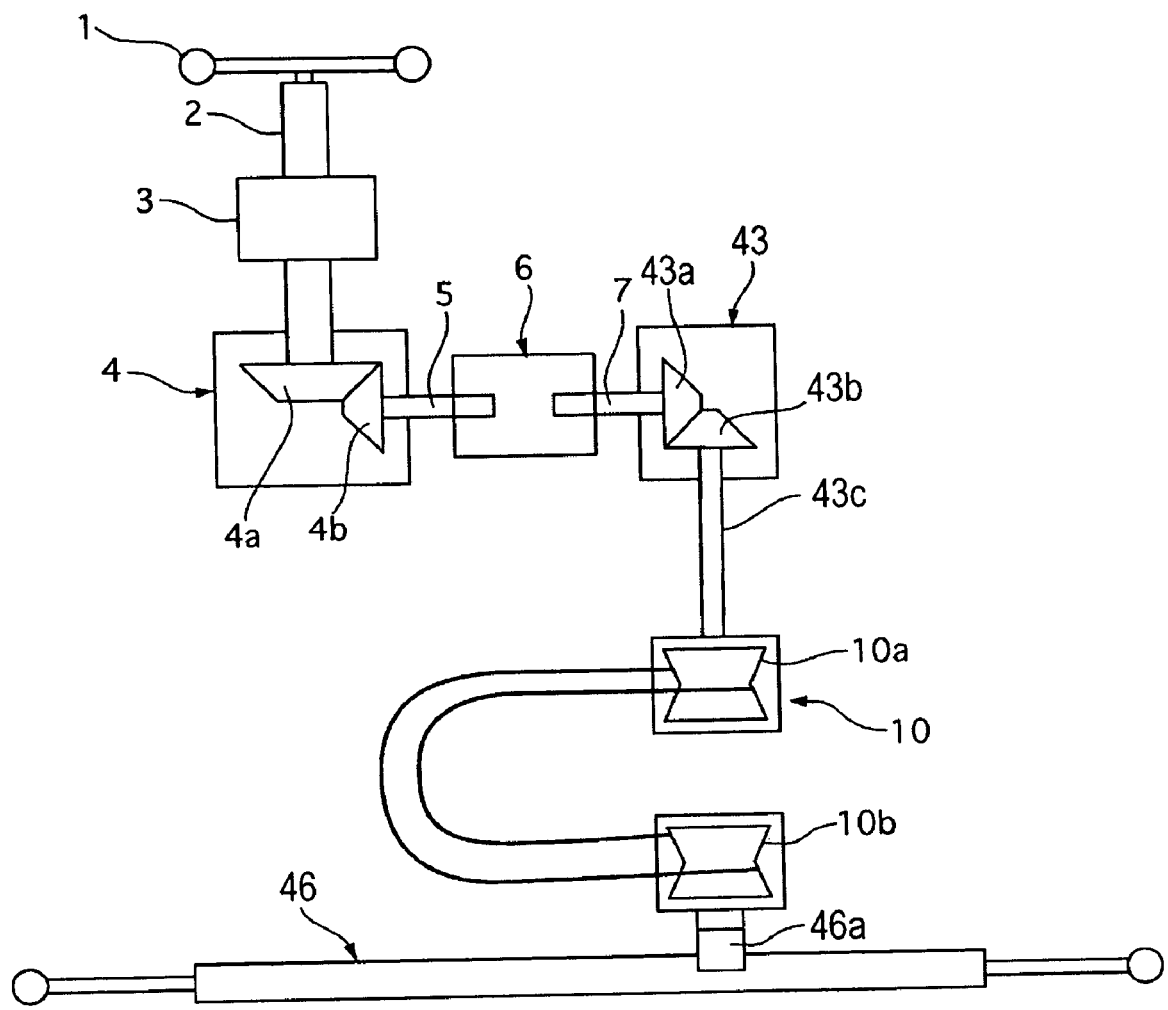
FIG. 19 is a schematic view of a vehicle steering apparatus according to Embodiment 13.

FIG. 19 is a schematic view of a vehicle steering apparatus according to Embodiment 13.

The same numerals as those of Embodiment 12 are assigned to the same structural elements as those of Embodiment 12, the description thereof is omitted.

The steering gear ratio of the steering gear (speed decreasing unit) 46a of the steering mechanism 46 is set so that the rotation number of the steering unit, which has been increased by the first bevel gear 4 can come back to the original rotation number.

When the steering gear ratio of the steering gear 26a is Z0, the normal steering gear ratio (the gear ratios of the steering gear 11 according to Embodiments 10-12) is Z0*, and the number of gears of the input gears 4a of the first bevel 4 and that of the output gears 4b thereof are Z1 and Z2, respectively, then the steering gear ratio Z0 satisfies the formula (4) set forth below.

$$Z0=Z0*x(Z2/Z1) \qquad (4)$$

Wherein Z1>Z2

According to Embodiment 13, the number of parts can be reduced. That is, Embodiment 13 uses the steering gear 46a of the steering mechanism 46 as the speed decreasing means, which reduces the rotation number that has been increased by the first bevel gear 4, and therefore, compared to the structure according to Embodiment 12 in which the speed decreasing gear 45 is separately provided, the number of parts can be reduced so that the length of a portion between the pinion-side cable pulley 10b of the cable-type column 10 and the steering mechanism 46 can be decreased.

The vehicle steering apparatus of Embodiment 4 has advantages set forth below.

(24) Since the steering gear 46a of the steering mechanism 46 is used as the speed decreasing unit, the cost can be reduced by reducing the number of parts and the steered unit B can become compact, compared to the structure according to Embodiment 12, which has a separate speed decreasing unit.

Embodiment 14

Embodiment 14 is an example in which the speed reduction ratio of the second bevel gear and the speed increasing ratio of the first bevel gear are different from each other. The structure thereof is described below.

Figure 20:
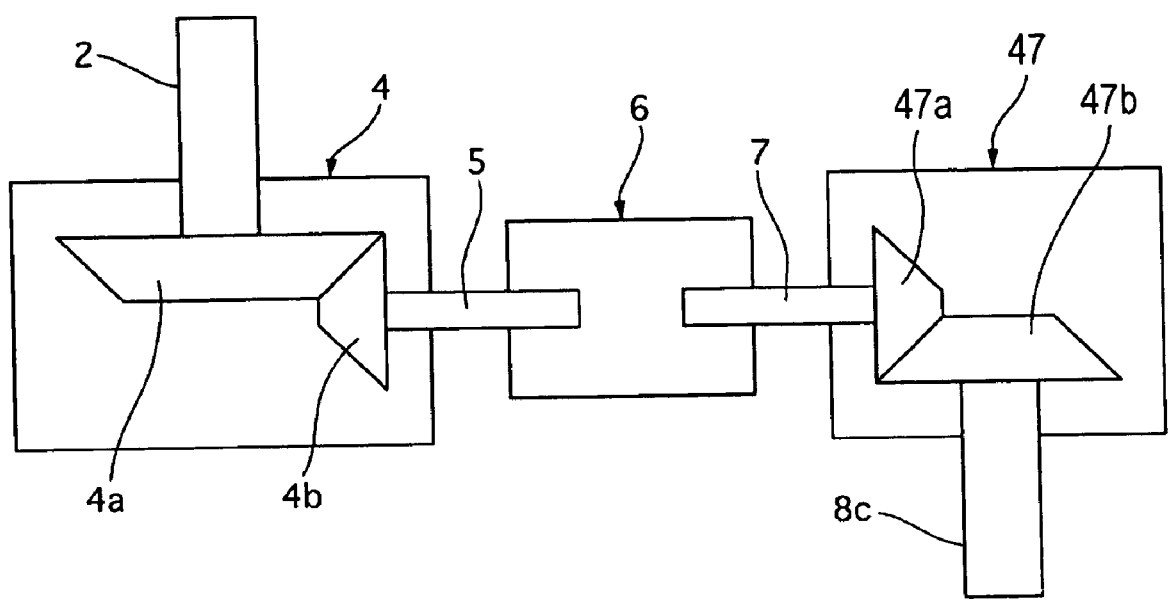
FIG. 20 is a schematic view of the detailed structure of a first bevel gear, a clutch and a second bevel gear.

FIG. 20 is a schematic view of a first bevel gear 4, a clutch 6 and a second bevel gear 47 according to Embodiment 14. The same numerals as those of Embodiment 14 are assigned to the same structural elements as those of Embodiment 1.

According to Embodiment 14, the speed decreasing ratio of the second bevel gear 47 (speed decreasing unit) is different from the speed increasing ratio of the first bevel gear 4. When the number of gears of the input gears 4a of the first bevel gear 4 and that of the output gears 4b thereof are Z1 and Z2, respectively, and the number of gears of the input gears 27a of the second bevel gear 27 and that of the output gears 27b are Z1" and Z2", respectively, then the steering gear ratio Z0 satisfies the formula (5) set forth below.

$$Z1/Z2.noteq.Z2"/Z2" \quad (5)$$

wherein Z1>Z2, Z1"<Z2"

In case of Z1/Z2>Z2"/Z1", the steered amount of the steering controlled wheels 22 and 22 becomes larger than the steering amount of the steering wheel 1 so that the steering gear ratio can be configured to be quick.

On the contrary, in the case where Z1/Z2<Z2"/Z1", the steered amount of the steering controlled wheels 22 and 22 becomes smaller than the steering amount of the steering wheel 1 so that the steering gear ratio can be configured to be slow.

Structure of Cable-Type Column

Referring now to FIGS. 21A, 21B and 21C, the cable-type column 10 comprises a steering wheel-side cable pulley 10a (for example, FIG. 1) which is connected to a column shaft 2, a steering controlled wheel-side cable pulley 10b (for example, FIG. 1), which is provided on an edge of the pinion shaft 21 (for example, FIG. 1), two inner cables 10g and 10h, which are connected to each other and which are winded around the cable pulleys 10a and 10b in opposite directions from each other, and outer tubes 10c and 10d that cover the inner cables 10g and 10h.

The steering wheel-side cable pulley 10a that is connected to the column shaft 2 is contained in a steering wheel-side pulley case 10e, and on the circumference of the pulley 10a, the ends of the two inner cables 10g and 10h are fixed, and additionally there are cable gutters that guide one of the two inner cables 10a and 10b to be winded and the other cable to be re-winded.

The steering controlled wheel-side cable pulley 10b that is connected to the end of the pinion shaft 21 is contained in a steering controlled wheel-side pulley case 10f, and on the circumference of the pulley 21 the ends of the two inner cables 10g and 10h are fixed to each other, and additionally cable gutters that guide one of the two inner cables 10g and 10h to be winded and the other cable to be re-winded are formed.

The outer tubes 10c and 10d cover the inner tubes 10g and 10h, and connect the steering wheel-side pulley case 10e and the steering controlled wheel-side pulley case 10f. A nut 10i to adjust the cable tension is provided between each of the outer tubes 10c and 10d and the steering controlled wheel-side pulley case 10f, respectively, and a spring 10j to adjust the cable tension is provided between each of the outer tubes 10c and 10d, and the steering wheel-side pulley case 10e, respectively. The nut 10i to adjust the cable tension and the spring 10j to adjust the cable tension are provided to adjust the cable tension (cable friction) by changing the lengths of the outer tubes 10c and 10d.

Figure 22:
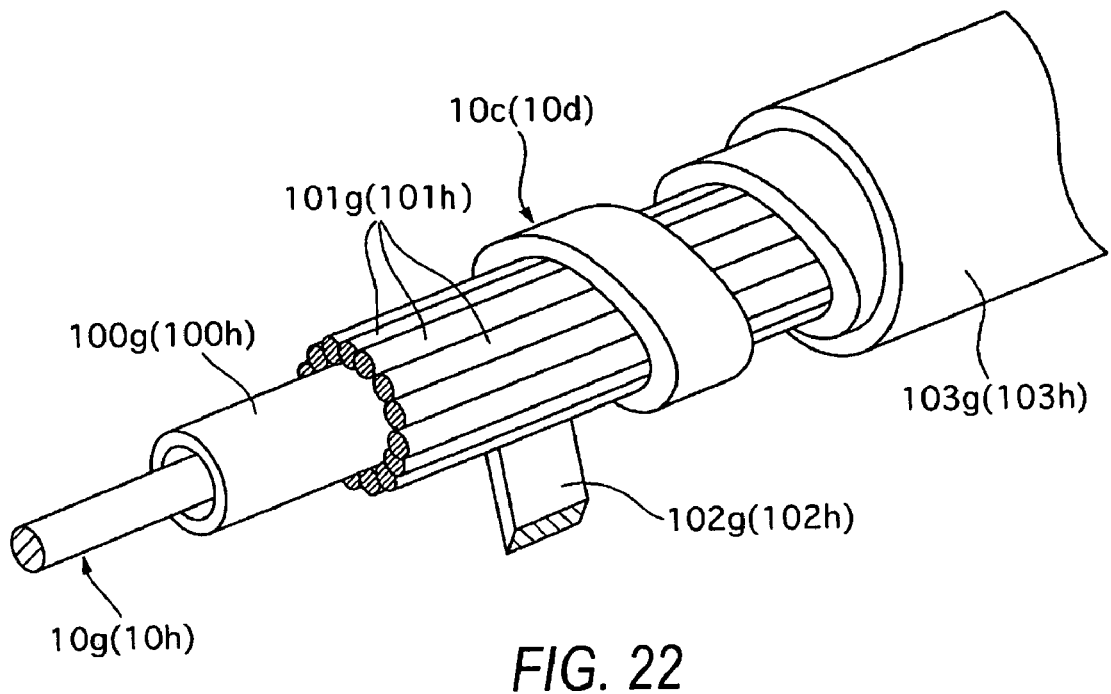
FIG. 22 is a partially cross-sectional and perspective view of the structure of an outer tube and an inner tube.
Figure 23:
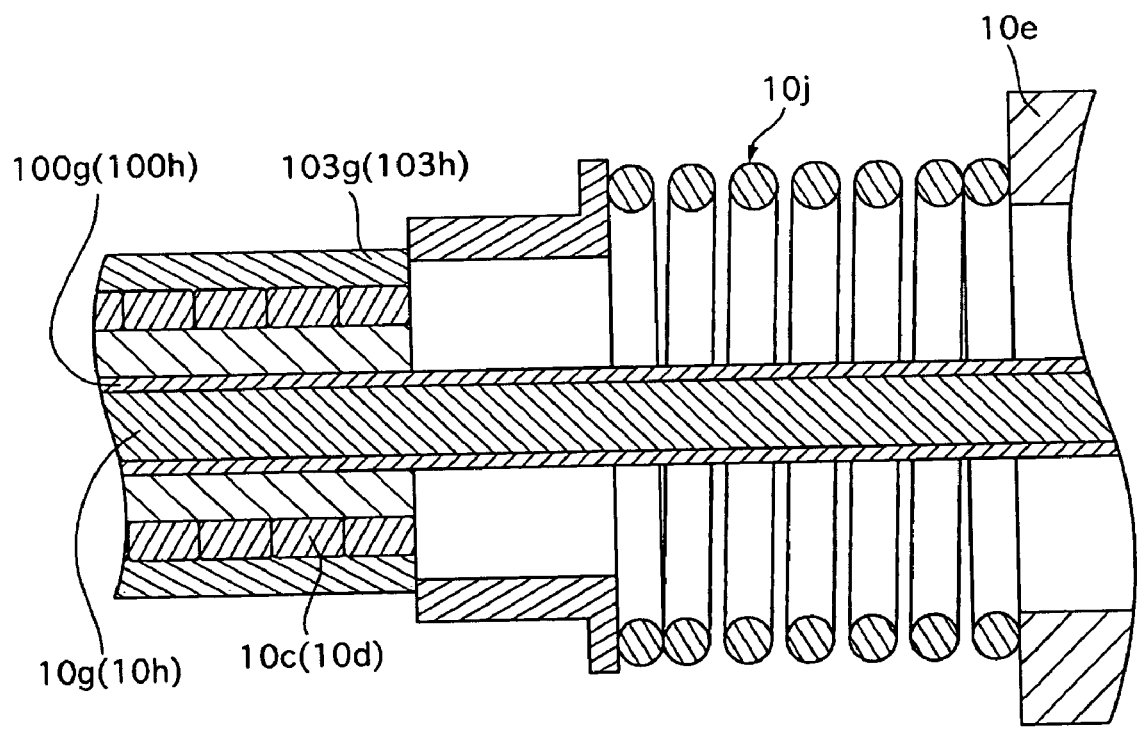
FIG. 23 is a cross-sectional view of the structure of an outer tube and an inner tube.

The outer tubes 10c and 10d are, as shown in FIG. 22, structured such that two or more metal wires 101g and 101h are provided in the axis direction along the circumference of the liners 100g and 100h that are made of a synthetic resin pipe material with a small friction resistance, and metal bands 102g and 102h are winded around the circumference in a spiral, and in addition, their circumference is covered by materials 103g and 103h made of synthetic resin. Furthermore, inside the outer tubes 10c and 10d, inner cables 10g and 10h, which are made from metal twisted wire made of stainless steel or aluminum, etc., as shown in FIG. 23, are slidably contained. Therefore, the outer tubes 10c and 10d support the tension that is applied in the axis direction by the two ere or more metal wires 101g and 101h, thereby preventing deformation thereof due to an extension. At the same time, the metal wires 101g and 101h are prevented from being separated when the inner cables 10g and 10h are bent by using the metal bands 102g and 102h. In addition, the bending of the outer tubes 10c and 10d is allowed by the spiral metal bands 102g and 102h.

In other words, the cable-type column 10 has a structure in which the two cable pulleys 10a and 10b, which are connected to the column shaft 2 and the end of the pinion shaft 21, are connected by the outer tubes 10c and 10d and the two inner cables 10g and 10h, which are winded around the cable pulleys 10a and 10b, respectively in the opposite direction from each other. When the steering wheel 1 is turned in one direction, one of the two sets of cables 10c and 10g, and cables 10g and 10h transmits the steering torque that is input by the driver, and the other cable transmits the reaction torque that is input by the steering controlled wheels 22 and 22, so as to perform the function equivalent to the column shaft 2.

As shown in FIGS. 15-20, according to Embodiments 10-14, the second bevel gear 8 is provided in the cabin space, and the steering wheel-side pulley case 10e of the cable-type column 10 is provided outside the cabin space (inside the engine room). The second bevel gear 8 and the steering wheel-side pulley case 10e are fixed to the dash panel 9 while sandwiching the dash panel (partition) 9 that separates the engine room and the cabin space.

Description of the structure of the steered unit will be described below.

The steered unit B comprises the steering mechanism 11 having a hydraulic assistance mechanism, the pinion shaft 21, and the steering controlled wheels 22 and 22. The steering mechanism 11 comprises a rack and pinion-type steering gear 11a and steers the steering controlled wheels 22 and 22 by corresponding to the rotation of the pinion shaft 21.

An assembling method of the cable-type column will be described below.

Figure 24:
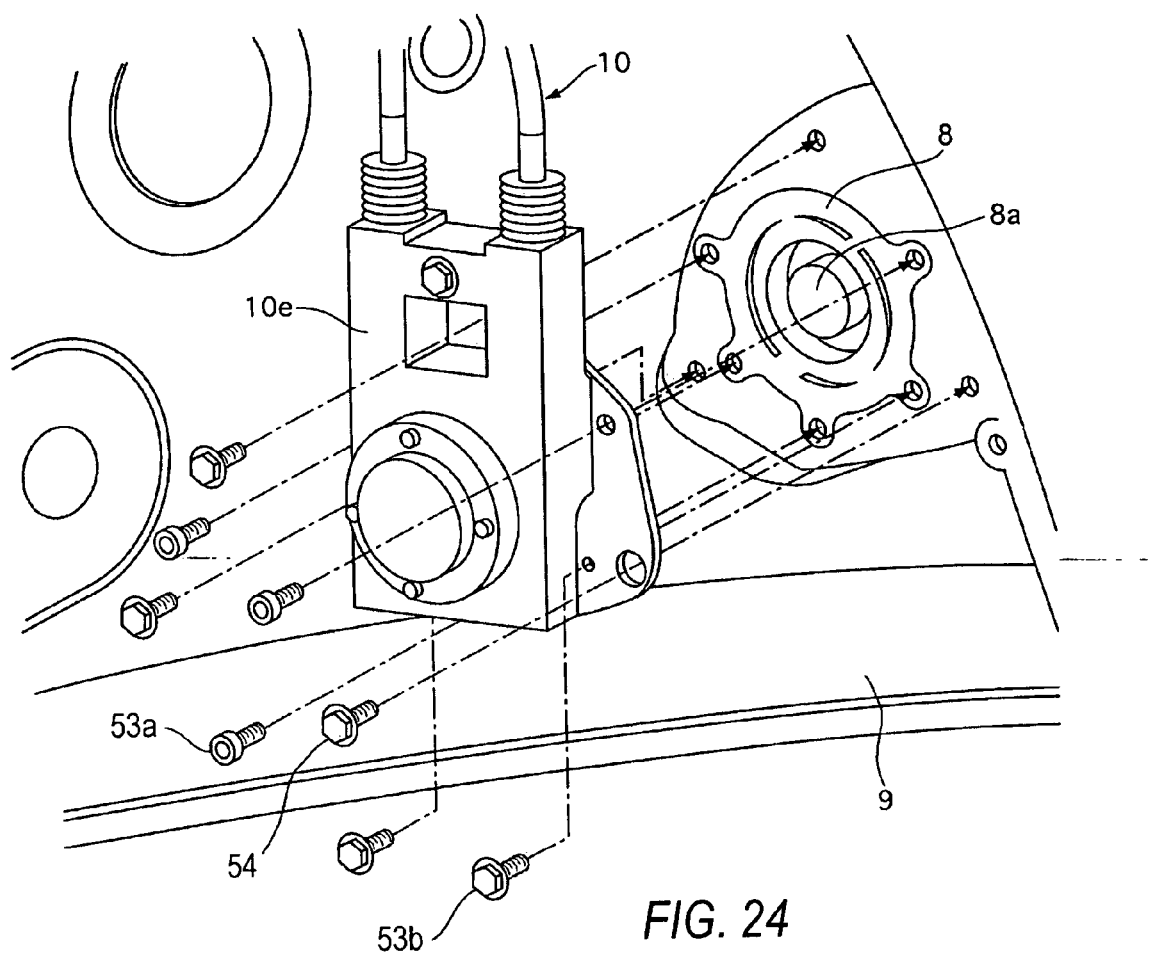
FIG. 24 is a perspective view of a dash panel which is viewed from the front side of the vehicle, illustrating a method of mounting a cable type column.

FIG. 24 is a perspective view of the dash panel 9 in order to explain an installation method of the cable-type 10 column according to Embodiments 10-14 viewed from the front of the vehicle.

Figure 25A:
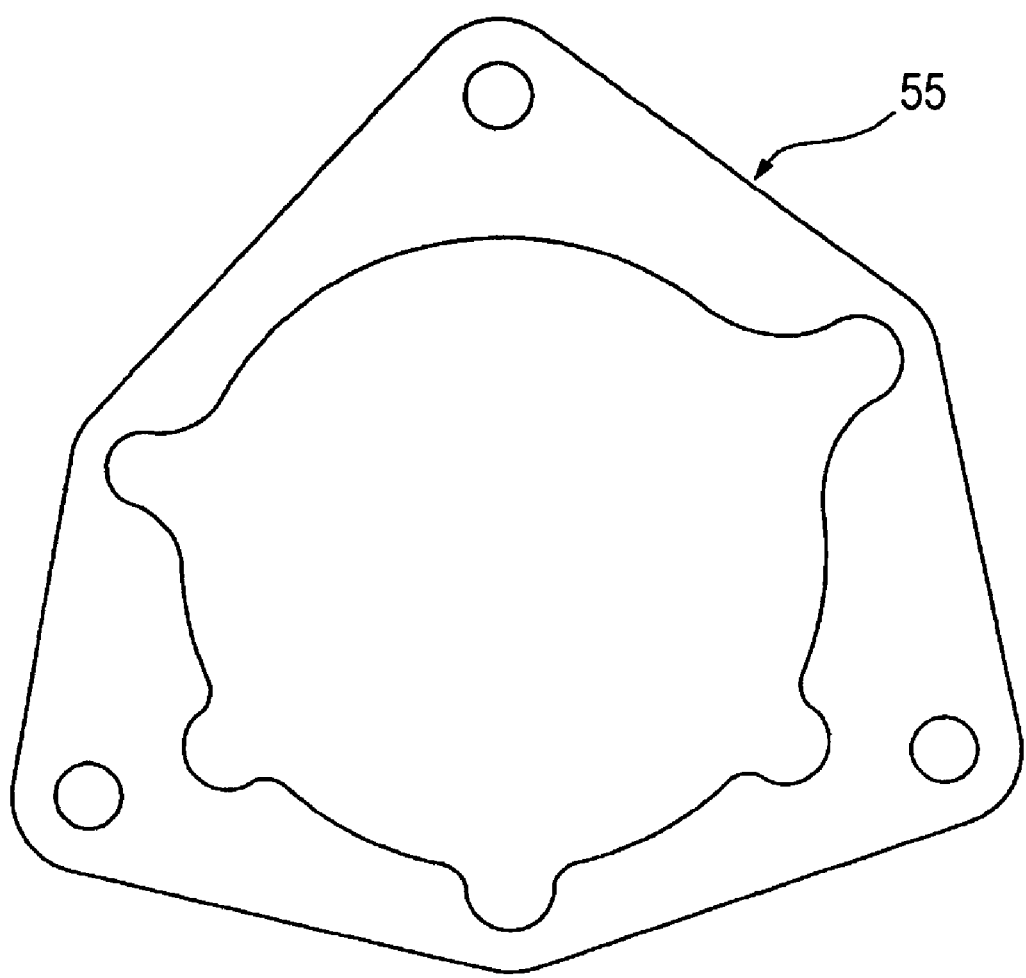
FIG. 25 is a plan view of a gasket.
Figure 25B:
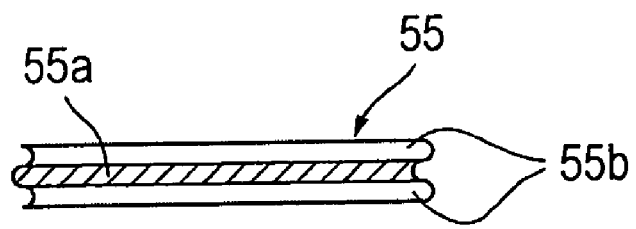

First, the second bevel gear 8 is aligned from the cabin space side at the designated assembling position on the dash panel 9. Then the steering wheel-side pulley case 10e is aligned from the outside of the cabin space on the dash panel 9. At this time, on the joint surface of the second bevel gear 8 and the steering wheel-side pulley case 10e, a gasket 55 in which a flexible rubber 55b made of NBR (nitrile rubber), etc., is pasted on a metal substrate 55a made of SPCC (general cold-rolled steel), etc., as shown in FIGS. 25A and 25B, is provided between them in order to prevent rain water from getting in the cabin space from the engine room.

After the alignment of the second bevel gear 8 and the steering wheel-side pulley case 10e, both of them are connected using bolts 53a and 53b from the outside of the cabin space. At this time, the serration shaft (output shaft) 8a of the second bevel gear 8 is inserted to a serration hole (not shown in the drawing) that is formed at the center of the steering wheel-side cable pulley 10*a*, and the second bevel gear 8 and the steering wheel-side cable pulley 10*a* are connected in a serrated manner.

Next, the steering wheel-side cable pulley 10*a* is fastened to the dash panel 9 using a bolt 54 from the outside of the cabin space so that the steering wheel-side pulley case 10*e* and the second bevel gear 8 are fixed to the vehicle body.

According to Embodiments 10-14, an assembly performance of the cable-type column can be improved. That is, the second bevel gear 8 is provided in the cabin space, the steering wheel-side cable pulley case 10*e* is provided outside the cabin space and both of them are fixed to the dash panel 9, and therefore, the steering-side pulley case 10*e* can be provided without leading the cables of 10*g* and 10*h* the cable-type column 10 through the dash panel 9, thereby allowing easy assembly of the cable-type column 10 to the vehicle body.

In addition, according to Embodiments 10-14, since only one section of cable and one set of pulleys (steering wheel side and steering controlled wheel side) are required, compared to the technology disclosed in Japanese Laid Open Patent Application No. H10-67327 in which an intermediate interlocking means is provided between a steering wheel and a gear box, the structure thereof can be simplified and the number of parts is reduced so that the cost can be reduced.

Furthermore, according to Embodiments 10-14, after the bevel gear 8 is fastened to the steering wheel-side pulley case 10*e* using a bolt, the steering wheel-side pulley case 10*e* is fastened to the dash panel 9 using a bolt thereby fastening the bevel gear 8 and steering wheel-side pulley case 10*e* to the vehicle body, so that the maintenance of the coaxial nature of the bevel gear 8 and the steering wheel-side pulley case 19*a*, and the sealing between the dash panel 9 and the steering wheel side pulley case 10*e* can be simultaneously carried out in a simple operation.

The vehicle steering apparatus according to Embodiments 10-14 has advantages set forth below.

(25) The dash panel 9 separates the cabin space where the steering wheel 1 is provided from the outside of the cabin space where the steered unit B is provided. The first bevel gear 4 that converts the axis direction of rotation inputted from the steering wheel 1 into another direction and the second bevel gear 8 that converts the axis direction of the rotation outputted from the first bevel gear 4 into the direction in which the shaft 8*c* goes towards the dash panel 9, are provided in the cabin space (the inside of the dash panel 9), and the steering wheel-side cable pulley 10*a* of the cable-type column 10 is provided outside the cabin space. Therefore, the assembly performance of the steering wheel-side cable pulley 10*a* can be improved without complicating the structure or increasing the number of parts.

(26) Since the steering wheel-side pulley case 10*e* is fixed to the dash panel 9, better sealing can be obtained compared to the case in which a steering rotation shaft that penetrates the dash panel 9 is provided.

(27) The bevel gear 8 is supported by the steering wheel-side pulley case 10*e*, and therefore maintenance of the coaxiality of the bevel gear 8 and the steering wheel-side pulley 10*a* and the sealing between the dash panel 9 and the steering wheel-side pulley ease 10*e* can be simultaneously carried out in a simple operation. In addition, waterproofing can be achieved with a conventional sealing structure.

Embodiment 15

Embodiment 15 is an example in which a cable-type column is used as a backup unit of the steer-by-wire system and a backup clutch is provided between the second bevel gear and the cable-type column.

Figure 26:
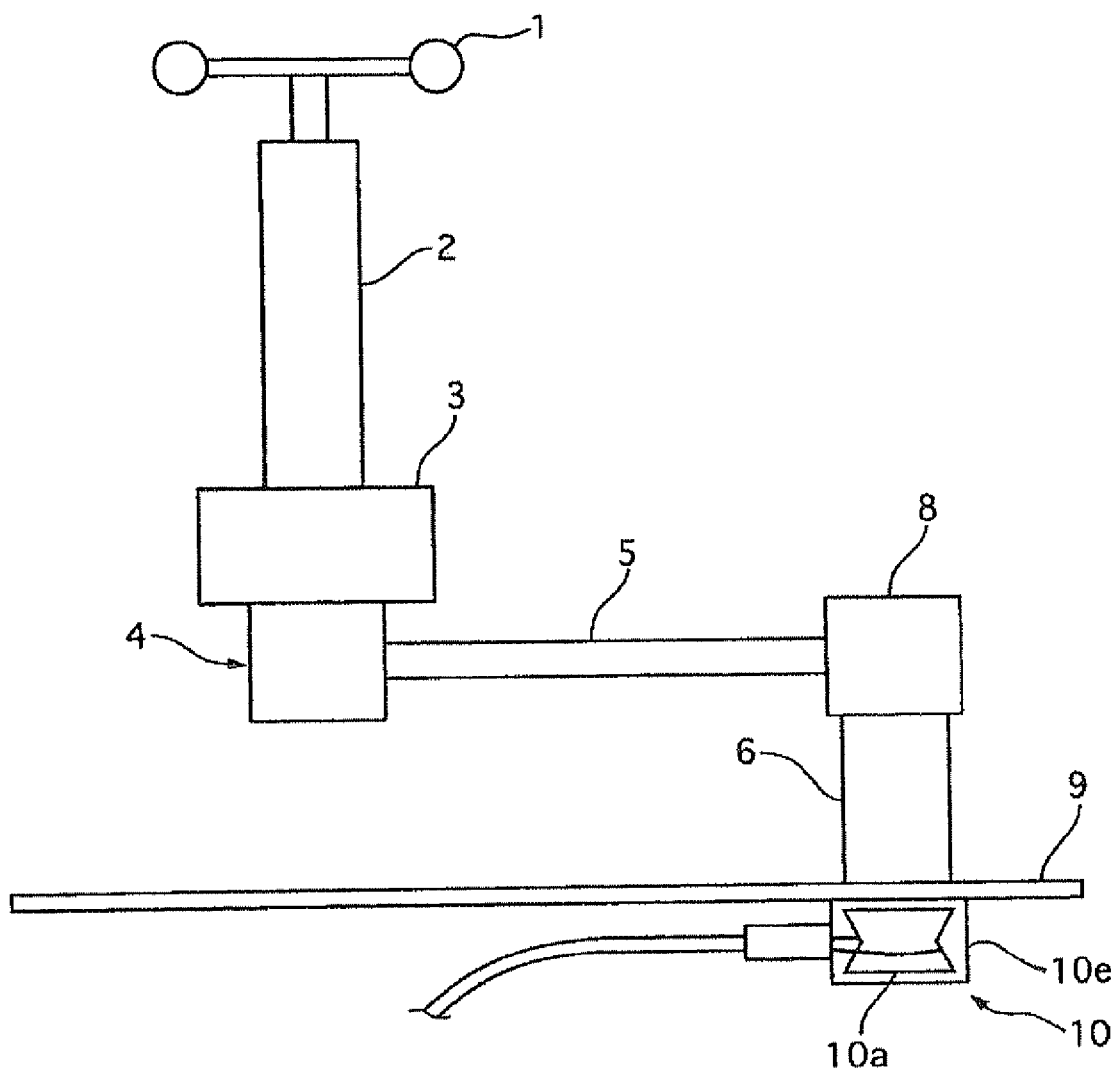
FIG. 26 is a schematic view of a steering unit of a vehicle steering apparatus according to Embodiment 15.

FIG. 26 shows the structure of the steering unit of the vehicle steering apparatus according to Embodiment 15. The same numerals as those of Embodiment 10 are assigned to the same structural elements as those of Embodiment 10.

According to Embodiment 15, a clutch 6 is provided between the second bevel gear 8 and the steering wheel-side pulley case 10*e* of the cable-type column 10, and the clutch 6 is arranged in the cabin space and the steering side pulley case 10*e* is arranged outside the cabin space sandwiching the dash panel 9.

The clutch 6 is fixed to the steering-side pulley case 10*e* from the outside of the cabin space by a bolt, in which the clutch 6 and the pulley case 10*e* sandwiches the dash panel 9, and the steering wheel-side pulley case 10*e* is fixed to the dash panel 9 from the outside of the cabin space by a bolt.

According to Embodiment 15, the layout space in the engine room is enlarged. That is, the clutch 6 is provided between the second bevel gear 8 and the steering wheel-side pulley case 10*e*, and the clutch 6 is arranged in the cabin space. Since outside the cabin space over the dash panel 9, namely in the engine room, a variety of parts such as a brake unit an ABC pedal unit, a wiper unit and a variety of pipes are arranged, it is possible to reduce the effect of the clutch 6 on the layout of the engine room by providing the clutch 6 in the cabin space.

In addition, since the clutch 6 is supported by the steering wheel-side pulley case 10*e*, and the steering-side pulley case 10*e* is fixed to the dash panel 9, the backup unit (clutch 6, cable-type column 10) can be integrated, thereby allowing a larger space around an instrument panel.

The vehicle steering apparatus according to Embodiment 15 has advantages set forth below, in addition to the advantages (25) and (26) of Embodiments 10-14.

(27) The clutch 6 that can disconnect the cable-type column 10 and the steering wheel 1 is provided and is arranged between the second bevel gear 8 and the steering wheel-side cable pulley 10*a*, thereby allowing integration of the backup unit (clutch 6 and cable-type column 10). In addition, the structure between the first bevel gear 4 and the second bevel gear 8 can be simplified, and the space around the instrument panel can be increased.

(28) Since the clutch 6 is provided in the cabin space, the clutch can be mounted in the vehicle even if there is no space for the clutch layout in the engine room.

(29) Since the clutch 6 is supported by the steering wheel-side pulley case 10*e*, and the steering wheel-side pulley case 10*e* is fixed to the dash panel 9, the coaxiality of the clutch 6 and the steering wheel-side pulley case 10*e* can be maintained while the space between the dash panel 8 and the steering wheel-side pulley case 10*e* can be sealed.

Embodiment 16

The structure of Embodiment 16 differs from the structure of Embodiment 15 in that the backup clutch is provided outside the cabin space.

Figure 27:
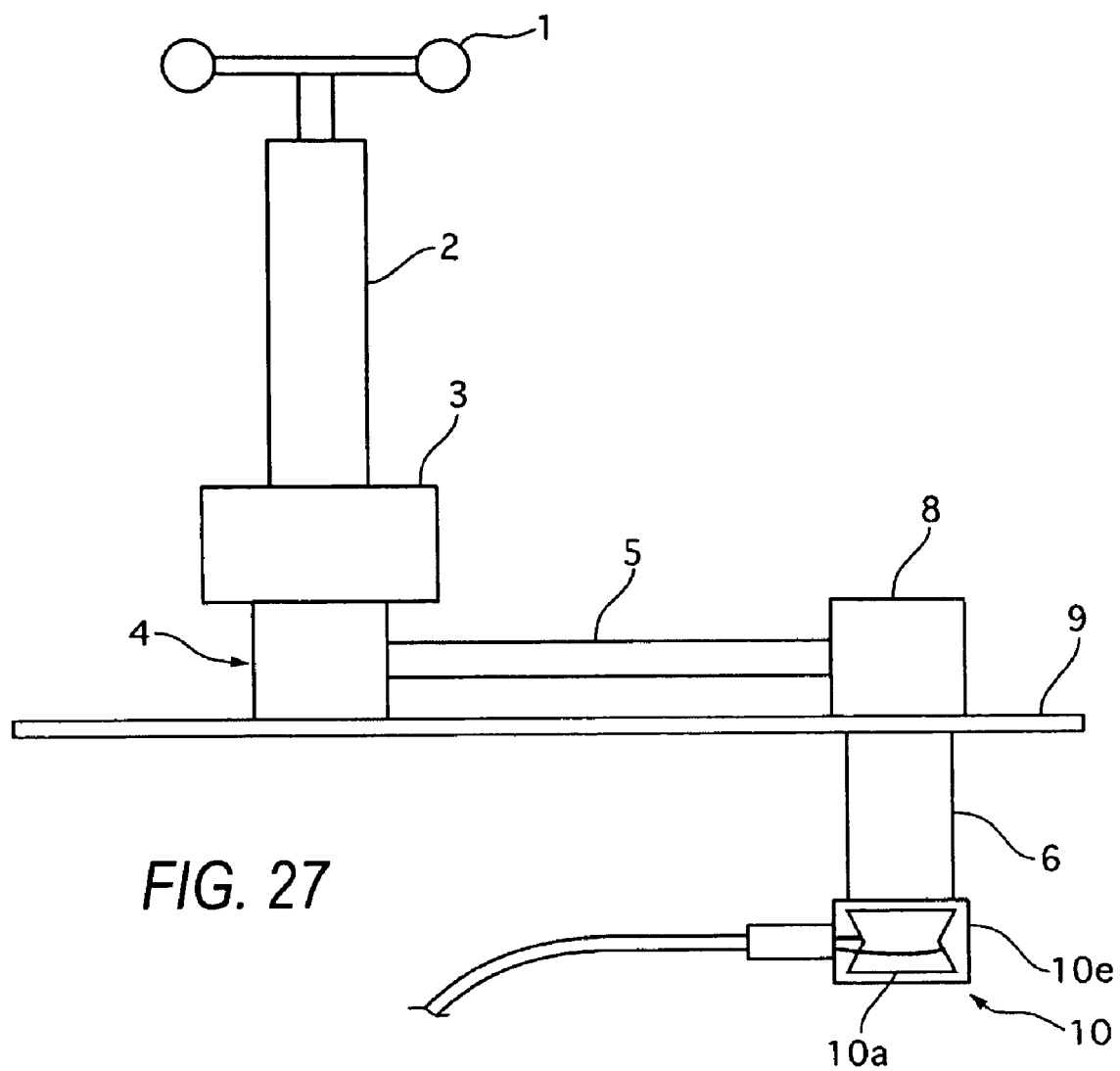
FIG. 27 is a schematic view of a steering unit of a vehicle steering apparatus according to Embodiment 16.

FIG. 27 shows the structure of a steering unit of the vehicle steering apparatus according to Embodiment 16. The structure thereof that is identical to Embodiment 15 has the same numerals and the description is omitted. The same numerals as those of Embodiment 15 are assigned to the same structural elements as those of Embodiment 15.

According to Embodiment 16, a clutch 6 is provided between the second bevel gear 8 and the steering wheel side pulley case 10e, and the second bevel gear 8 is provided in the cabin space and the clutch 6 is provided outside the cabin space sandwiching the dash panel 9.

The second bevel gear 8 is fixed to the clutch 6 from the outside of the cabin space by a bolt, sandwiching the dash panel 9 therebetween, and the clutch 6 is fixed to the dash panel 9 from the outside of the cabin space by a bolt.

According to Embodiment 16, the layout space around an instrument panel is enlarged. That is, the clutch 6 is provided between the second bevel gear 8 and the steering wheel-side pulley case 10e, and the clutch 6 is provided outside the cabin space. In the cabin space side of the dash panel 9, namely around the instrument panel area, a variety of pans such as an air conditioning unit, an ECU, a key cylinder, and a variety of harnesses are arranged and therefore, by providing the clutch 6 in the engine room, it is possible to allow less effect thereof in the layout of the cabin space.

In addition, in such a structure, since an operational noise of the clutch 6 hardly reaches the driver, the noise proof structure can be simplified, compared to the case in which the clutch 6 is provided in the cabin space, and the structure of the parts will not be complicated.

Embodiment 16 has advantages set forth below, in addition to the advantages (25) and (26) of Embodiments 10-14.

(30) Since the clutch 6 is provided outside the cabin space, the clutch 6 can be mounted in the vehicle even if there is no clutch layout space in the cabin space.

(31) Since the second bevel gear 8 is supported by the clutch 6, and fixed to the dash panel 9, the coaxiality of the second bevel gear 8 and the clutch 6 can be maintained while the space between the dash panel 9 and the steering wheel-side pulley case 10e can be sealed.

Embodiment 17

Embodiment 17 is an example in which the second bevel gear that is provided in the cabin space and the cable-type column provided outside the cabin space are connected by a steering rotation shaft having a joint structure.

Figure 28:
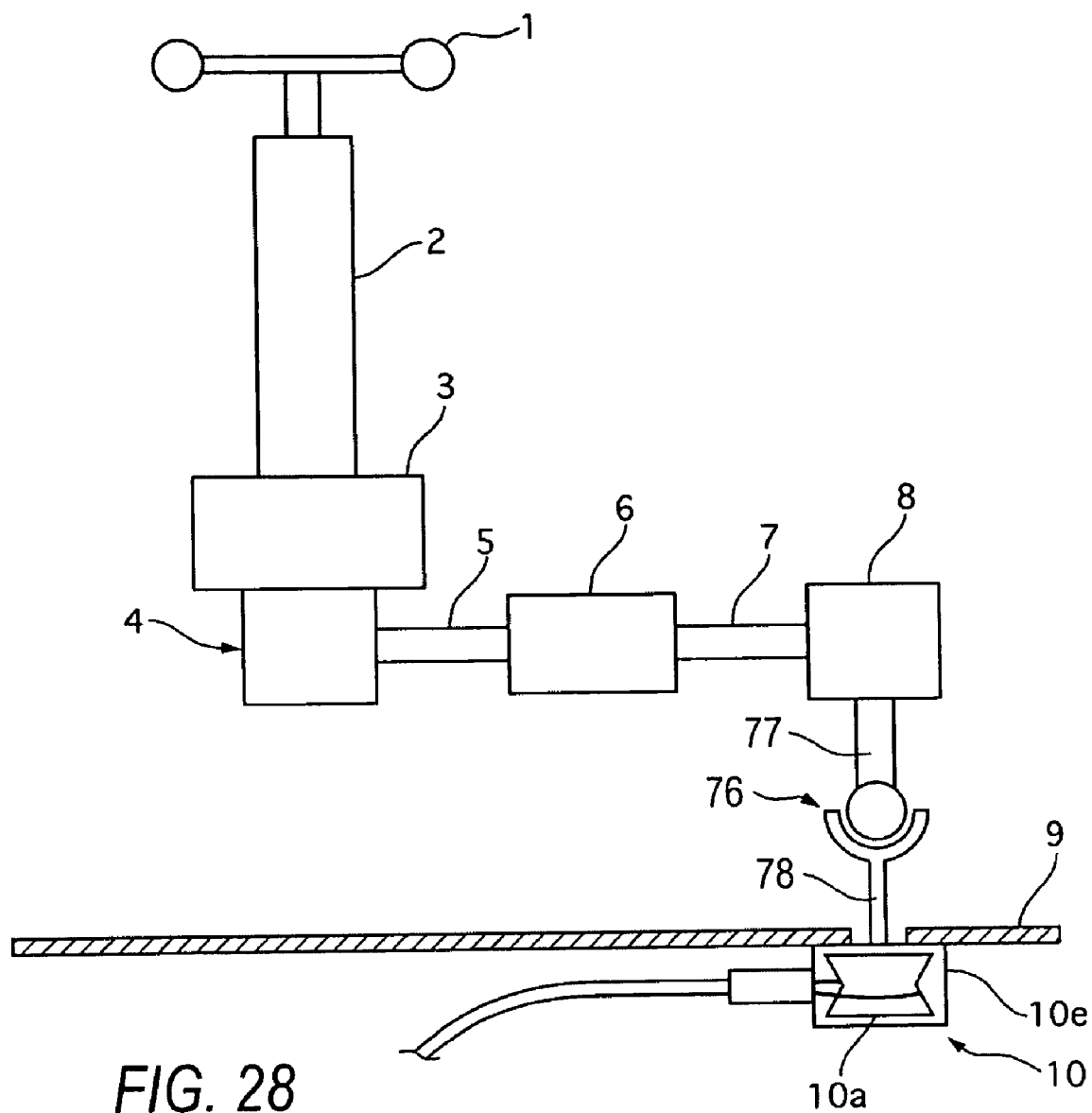
FIG. 28 is a schematic view of a steering unit of a vehicle steering apparatus according to Embodiment 17.

FIG. 28 shows the structure of the steering unit of the vehicle steering apparatus according to Embodiment 17 The same numerals as those of Embodiment 10 are assigned to the same structural elements as those of Embodiment 10.

According to Embodiment 17, a universal joint 76 is provided between the second bevel gear 8 that is provided in the cabin space and the steering wheel-side pulley case 10e that is provided outside the cabin space, sandwiching the dash panel 9 therebetween.

Figure 29:
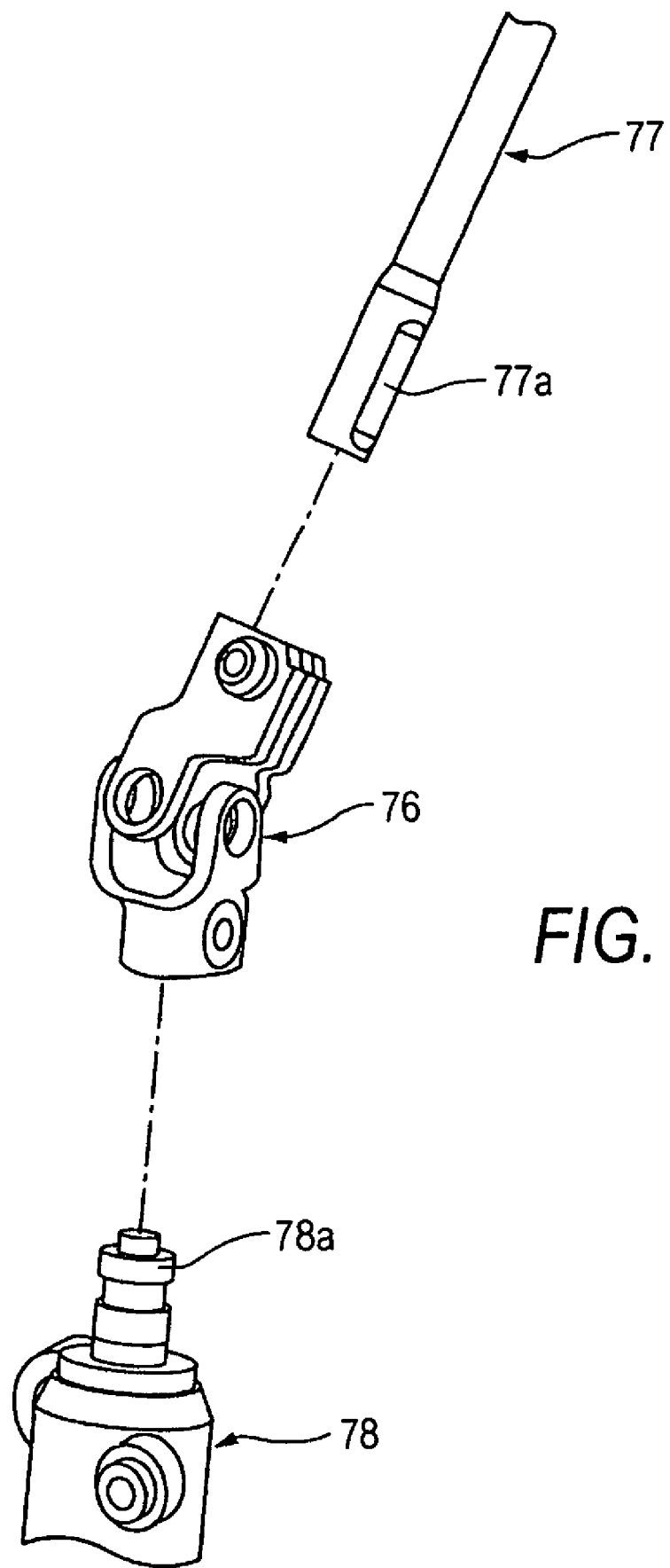
FIG. 29 is a diagram showing a method for connecting a shaft and a universal joint.

The universal joint 76 is provided in the cabin space so as to connect a shaft 77 that is connected to the second bevel gear 8 and a shaft 78 that is connected to the steering wheel-side cable pulley 10a. As shown in FIG. 29, on the tip of the two shafts 77 and 78, serrations 77a and 78a are formed, and these serrations 77a and 78a are inserted into the serration holes (not shown in the drawing) that are formed on the universal joint 76, and therefore the shafts 77 and 78 and the universal joint 76 are connected with the serrations.

According to Embodiment 17, the assembly is facilitated. That is, in case where the power transmission path between the units (second bevel gear 8 and steering wheel-side cable pulley 10a) that sandwich the dash panel 9 is formed by a steering rotation shaft, since the second bevel gear 8 and the steering wheel-side pulley case 10e need to be coaxially provided, the assembling is complicated.

On the contrary, according to Embodiment 17, the coaxiality of the two shafts 77 and 78 can be maintained by simply inserting the shafts 77 and 78 into the universal joint 76. In other words, the universal joint 76 can absorb the offsetting of the shaft center of the shafts 77 and 78, thereby allowing easy connection of the torque transmission mechanism between the units (second bevel gear 8 and steering wheel-side cable pulley 10a) that sandwich the dash panel therebetween, and therefore the assembly operation can be easily carried out.

Embodiment 17 has advantages set forth below, in addition to advantages (25) and (26) of Embodiments 10-14.

(32) The universal joint 76 is provided between the steering rotation shafts (shafts 77 and 78) that penetrates the dash panel 9, and therefore the torque transmission mechanism between the units (second bevel gear 8 and steering wheel-side cable pulley 10a) that sandwich the dash panel 9 therebetween can be easily connected.

Other Embodiments

Although the best modes for carrying out the present invention are described by referring to Embodiments 1 to 17, the detailed structure thereof is not limited to Embodiments 1 to 17 and the design modifications, etc, within the range that does not divert the purpose of the invention shall be included in the present invention.

For example, although according to Embodiments 1 to 17, the bevel gear is used as the rotation direction conversion means, any structure can be adopted as long as the rotation direction conversion means is located between the reaction motor of the steering unit and the clutch, and changes the rotation axis direction of the clutch relative to the rotation axis direction of the operations input means, and for example, a universal joint can be used therefor. The backup mechanism is not limited to the cable type column but may be a shaft.

In addition, although in Embodiments 8 and 9 the illustrated examples use the joint 25 of Embodiment 5 as the joint, the joints 26 or 29 of Embodiment 6 or 7 can be used as well.

The preceding description has been presented only to illustrate and describe exemplary embodiments of the systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A steering apparatus for a vehicle, comprising:
   a steering unit having an operational input unit and a reaction actuator;
   a steered unit that is mechanically separated from the steering unit and that steers steering controlled wheels;
   a clutch that is provided between the steering unit and the steered unit;

a backup unit that is provided between the clutch and the steered unit and transmits a steering torque that is inputted from the operational input unit, when the clutch is engaged, to the steering controlled wheels; and a first rotation conversion unit provided between the reaction actuator of the steering unit and the clutch that changes a rotation axis direction of the operational input unit.

2. The steering apparatus for a vehicle according to claim 1, wherein the first rotation conversion unit changes the rotation axis direction by about 90 degrees.

3. The steering apparatus for a vehicle according to claim 1, wherein the first rotation conversion unit outputs a rotation of the operational input unit towards the outside of the vehicle in a width direction of the vehicle.

4. The steering apparatus for a vehicle according to claim 1, wherein the first rotation conversion unit outputs a rotation of the operational input unit towards the inside of the vehicle in a width direction of the vehicle.

5. The steering apparatus for a vehicle according to claim 1, wherein the first rotation conversion unit outputs a rotation of the operational input unit in a downward direction of the vehicle.

6. The steering apparatus for a vehicle according to claim 1, wherein the backup unit comprises a cable-type column, and the clutch transmits the rotation outputted from the first rotation conversion unit to the cable-type column when the clutch is engaged.

7. The steering apparatus for a vehicle according to claim 1, further comprising a shaft that connects the first rotation conversion unit to the clutch, wherein the shaft has a joint in which a connection thereof comes apart when a load is applied to the joint in a direction perpendicular to an axis direction of the shaft.

8. The steering apparatus for a vehicle according to claim 1, further comprising a second rotation conversion unit provided between the first rotation conversion unit and the steered unit, wherein the second rotation conversion unit changes a rotation axis direction of the first rotation conversion unit towards the steered unit.

9. The steering apparatus for a vehicle according to claim 8, wherein the clutch is provided between the first rotation conversion unit and the second rotation conversion unit.

10. The steering apparatus for a vehicle according to claim 9, wherein the first rotation conversion unit includes a speed increasing unit that increases a rotation to be inputted to the clutch.

11. The steering apparatus for a vehicle according to claim 10, wherein the second rotation conversion unit includes a speed decreasing unit that decreases a rotation to be outputted to the steered unit.

12. The steering apparatus for a vehicle according to claim 10, further comprising a speed decreasing unit that decreases a rotation to be inputted to the steered unit, the speed decreasing unit disposed between the backup unit and the steered unit.

13. The steering apparatus for a vehicle according to claim 10, wherein the steered unit includes a speed decreasing unit that decreases a rotation to be inputted to the steered unit.

14. The steering apparatus for a vehicle according to claim 8, further comprising a bulkhead that divides a cabin space and an outside of the cabin space, wherein the steering unit is provided in the cabin space, and the steered unit is provided outside of the cabin space, and the first and second rotation conversion units are provided on a steering unit side of the bulkhead and the backup unit is provided on a steered unit side of the bulkhead.

15. The steering apparatus for a vehicle according to claim 14, wherein the clutch is provided on the steering unit side of the bulkhead.

16. The steering apparatus for a vehicle according to claim 14, wherein the clutch is provided on the steered unit side of the bulkhead.

17. The steering apparatus for a vehicle according to claim 1, further comprising a bulkhead that divides a cabin space and an outside of the cabin space, wherein the steering unit is provided in the cabin space, and the steered unit is provided outside of the cabin space, and the first rotation conversion unit changes the rotation axis direction of the operational input unit towards a direction along the bulkhead.

18. The steering apparatus for a vehicle according to claim 1, further comprising a bulkhead that divides a cabin space and an outside of the cabin space, wherein the steering unit is provided in the cabin space, and the first rotation conversion unit changes the rotation axis direction to reduce a length of the steering unit in a longitudinal axis direction of the vehicle.

19. A steering apparatus for a vehicle, comprising:
a steering means having an operational input means and a reaction generating means;
a steered means that are mechanically separated from the steering means and that steers steering controlled wheels;
a clutch that is provided between the steering means and steered means;
a backup means that is provided between the clutch and the steered means and transmits a steering torque that is inputted from the operational input means, when the clutch is engaged, to the steering controlled wheels; and
a first rotation conversion means provided between the reaction generating means and the clutch, for changing a rotation axis direction of the operational input means.

* * * * *